United States Patent [19]

Kreuzenztein et al.

[11] Patent Number: 5,491,799
[45] Date of Patent: Feb. 13, 1996

[54] COMMUNICATION INTERFACE FOR UNIFORM COMMUNICATION AMONG HARDWARE AND SOFTWARE UNITS OF A COMPUTER SYSTEM

[75] Inventors: Ronald K. Kreuzenztein, Sunnyvale; Mark Vongnechten, Fremont; Kai C. Wong, Sunnyvale, all of Calif.

[73] Assignee: Amdahl Corporation, Sunnyvale, Calif.

[21] Appl. No.: 282,777

[22] Filed: Jul. 29, 1994

Related U.S. Application Data

[63] Continuation of Ser. No. 816,865, Jan. 2, 1992, abandoned.

[51] Int. Cl.⁶ .................................................. G06F 13/00
[52] U.S. Cl. ........................... 395/200.08; 364/DIG. 1; 364/281; 364/285; 364/246.8
[58] Field of Search ........................... 364/134, 141; 395/200, 250, 275, 325, 425, 725, 800, 650, 700

[56] References Cited

U.S. PATENT DOCUMENTS

| | | | |
|---|---|---|---|
| 3,648,252 | 3/1972 | Thron et al. | 395/275 |
| 4,073,005 | 2/1978 | Parkin | 395/650 |
| 4,253,144 | 2/1981 | Bellamy et al. | 395/425 |
| 4,325,120 | 4/1982 | Couey et al. | 395/375 |
| 4,394,727 | 6/1983 | Hoffman et al. | 395/650 |
| 4,402,046 | 8/1983 | Cox et al. | 395/200 |
| 4,404,628 | 9/1983 | Angelo | 395/200 |
| 4,488,231 | 12/1984 | Yu et al. | 395/425 |
| 4,543,627 | 9/1985 | Schwab | 395/200 |
| 4,587,609 | 5/1986 | Boudreau et al. | 395/725 |
| 4,862,354 | 8/1989 | Fiacconi et al. | 395/200 |
| 4,949,239 | 8/1990 | Gillett, Jr. et al. | 395/325 |
| 5,136,718 | 8/1992 | Haydt | 395/800 |
| 5,142,683 | 8/1992 | Burkhardt, Jr. et al. | 395/725 |
| 5,210,828 | 5/1993 | Bolan et al. | 395/200 |
| 5,325,492 | 6/1994 | Bonevento et al. | 395/325 |
| 5,339,427 | 8/1994 | Elko et al. | 395/725 |
| 5,375,219 | 12/1994 | Okabe | 395/425 |

*Primary Examiner*—Christopher B. Shin
*Assistant Examiner*—Lance L. Barry
*Attorney, Agent, or Firm*—Fliesler, Dubb, Meyer & Lovejoy

[57] ABSTRACT

A SYStem COMmunication interface (SYSCOM) unit provides uniform communication between hardware and software units of a computer system. The computer units include Central Processing Units (CPU's), Input/Output Processors (IOP's), Service Processor (SVP), and Control State Software (CSSW) which runs on the CPU's operating in Control State. The SYSCOM communication interface includes signalling hardware, control blocks in storage, and a uniform communication method used for communication between the computer units. The communication method sends messages between an originating unit (ORG.U) and one or more destination unit(s) [DES.U(s)].

1 Claim, 10 Drawing Sheets

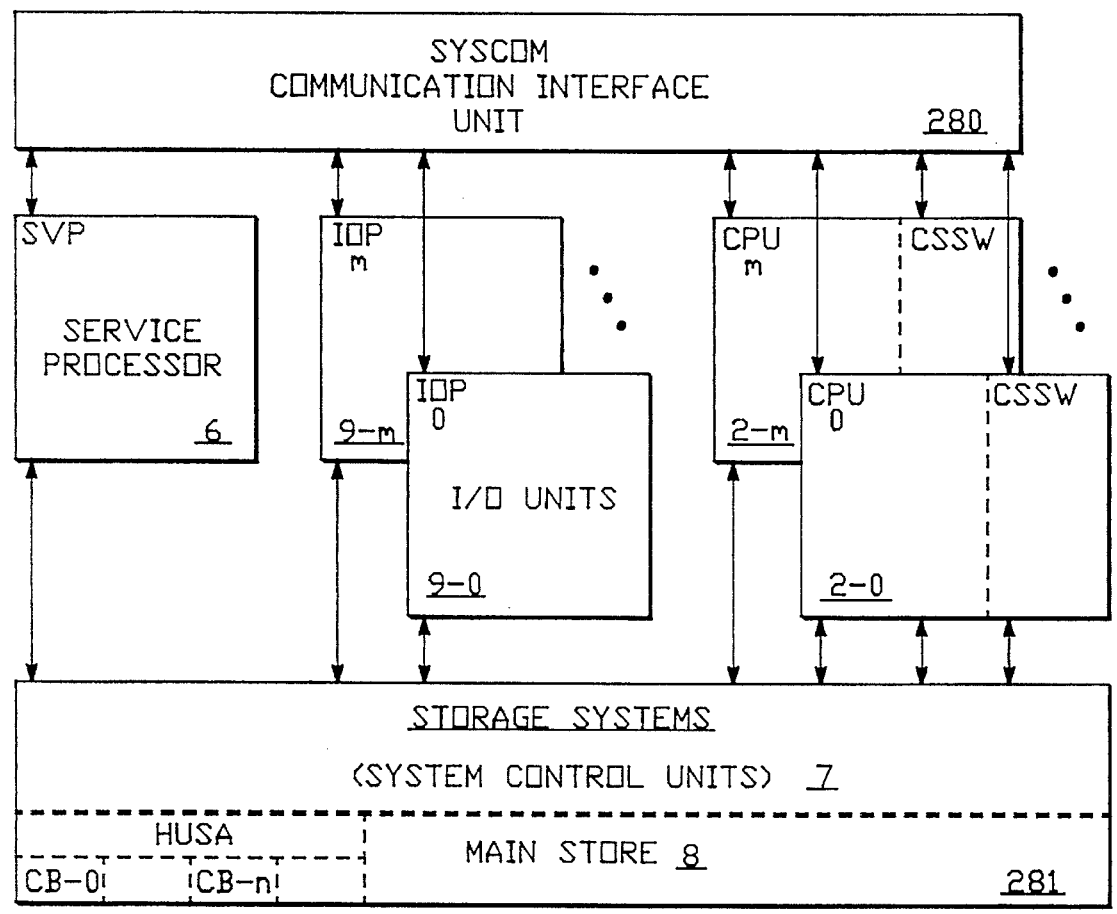
FIG.—1
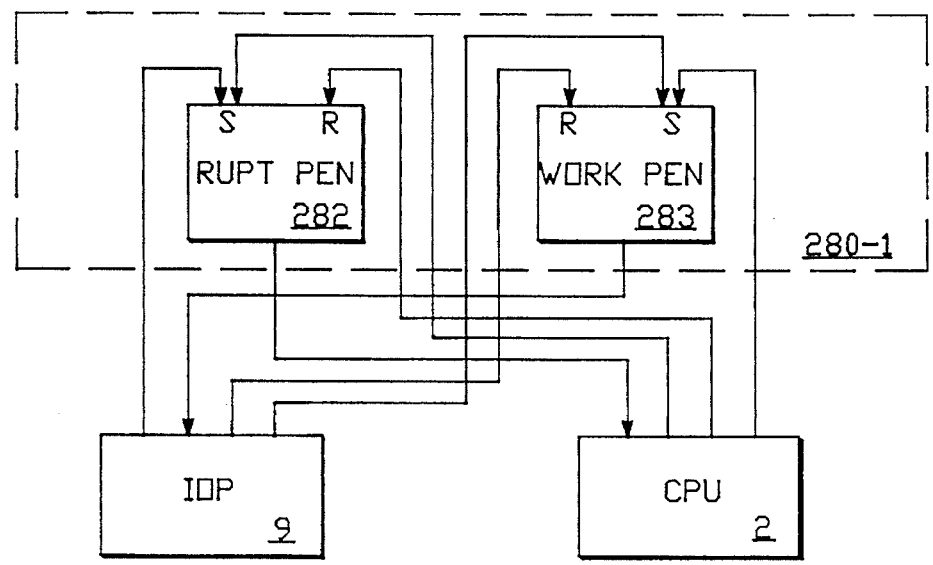
FIG.—2

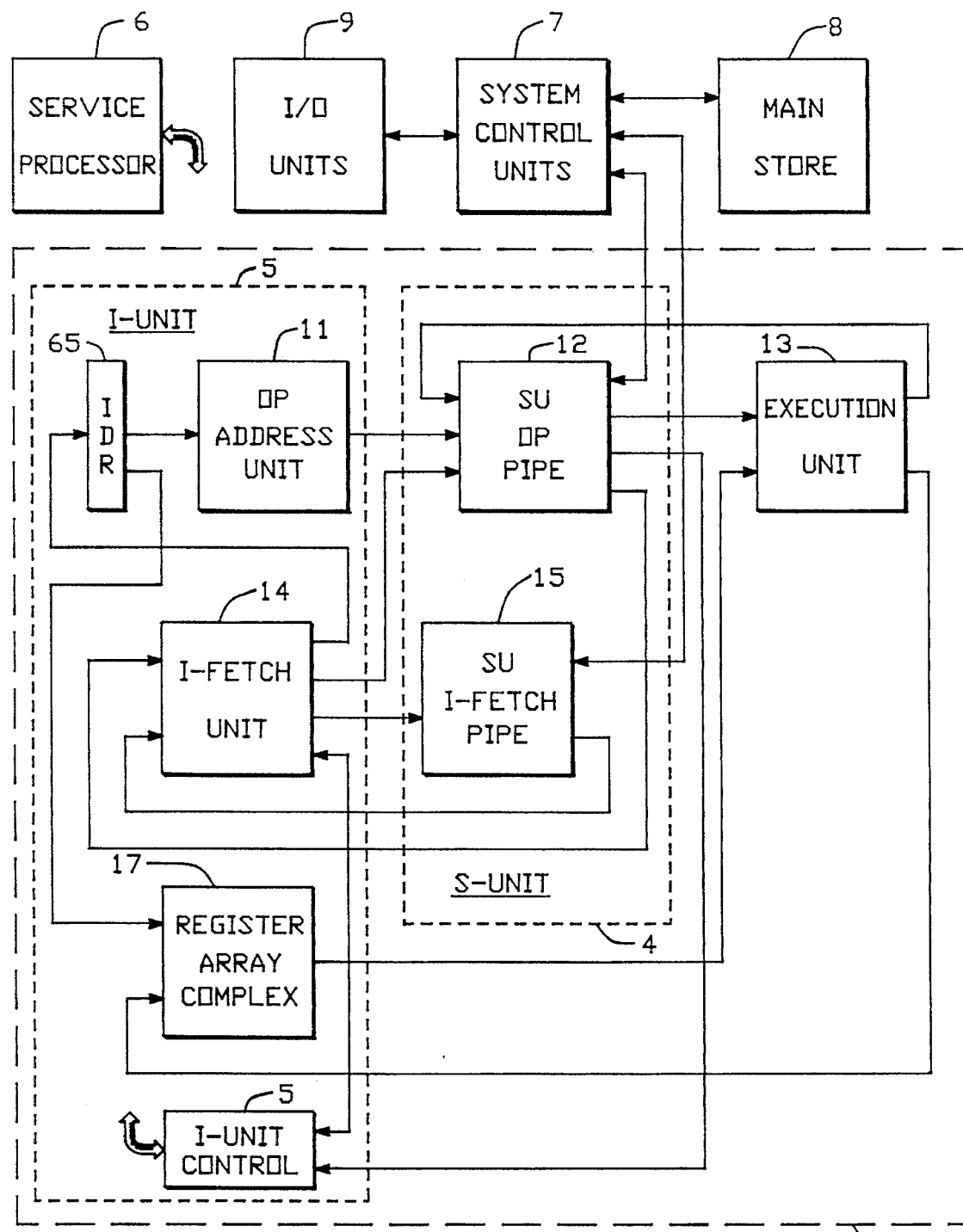
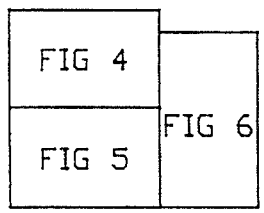
FIG.-3

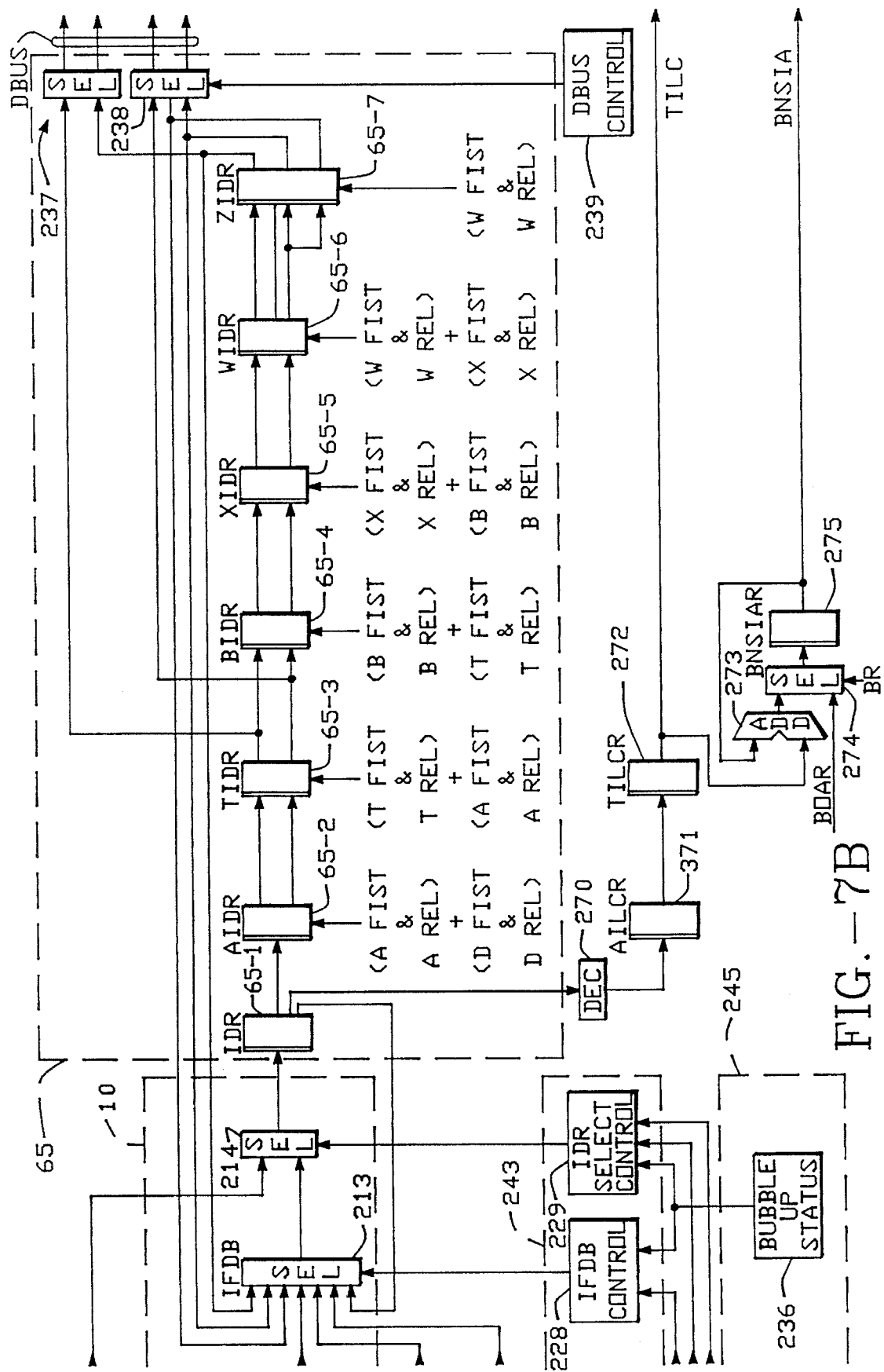
FIG.—7B

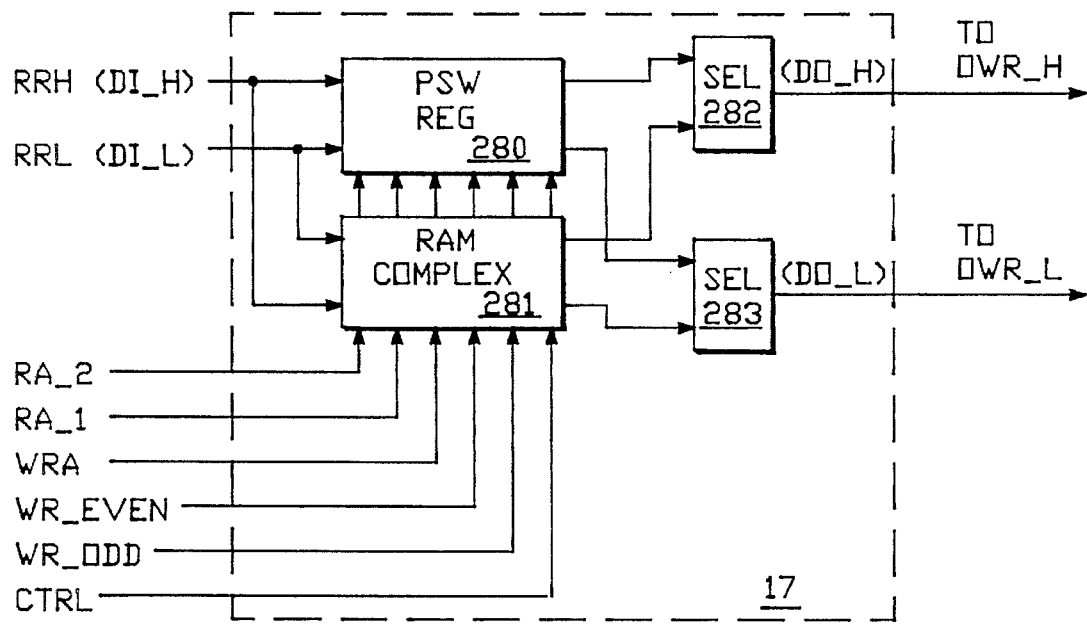
FIG.—8
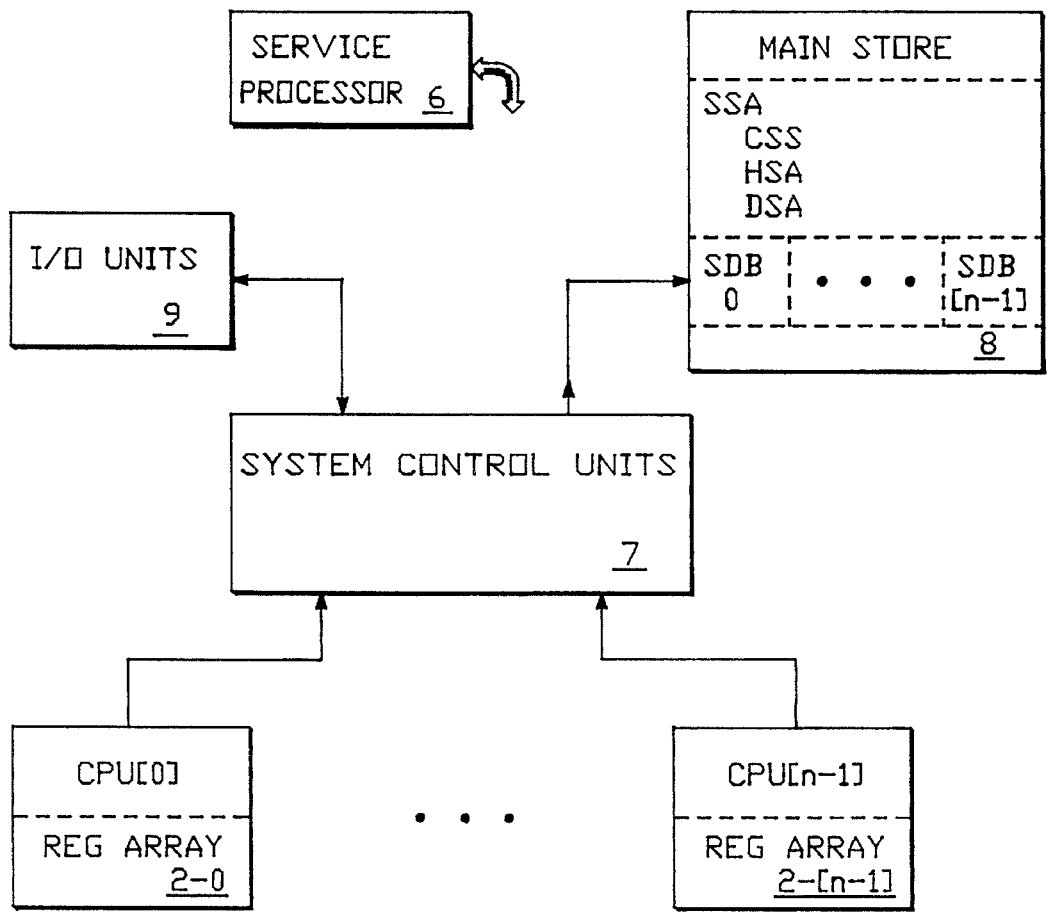
FIG.—9

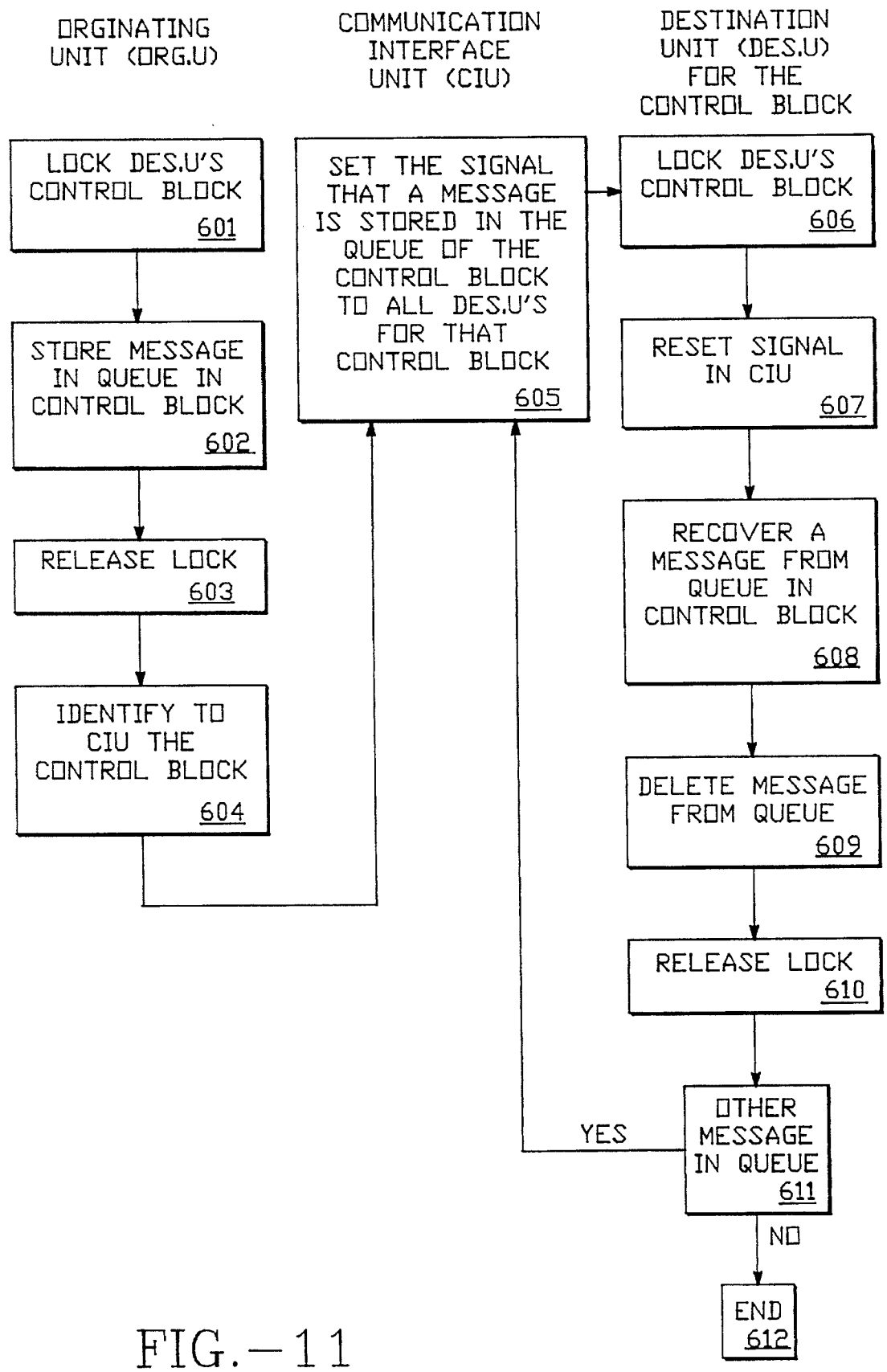
FIG.—11

COMMUNICATION INTERFACE FOR UNIFORM COMMUNICATION AMONG HARDWARE AND SOFTWARE UNITS OF A COMPUTER SYSTEM

This application is a continuation of Ser. No. 07/816,865, filed Jan. 2, 1992, now abandoned.

BACKGROUND OF THE INVENTION

1. Field of the Invention

The present invention relates to the field of computers and particularly to computer systems that operate in accordance with the IBM ESA/390 architecture and particularly to computers that have communication among units that form the computer system.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Related Art

In prior art systems, units communicate using a number of different communication methods. For example, there is one method for handling interruptions and yet another method for handling work requests sent from one unit to another.

In general, computer systems can be described as having two layers of architecture, an outer layer and an inner layer. The outer layer is the architectural layer which is defined, for example, in a specification such as the Principles of Operation (POO) for the IBM Extended System Architecture (ESA)/390. Viewed at the outer layer, an interruption is an unexpected transfer of control. Viewed at the inner layer, the details of how the interruption is processed are seen. Many interruption requests may exist concurrently in a computer system. The inner layer must maintain a list of interrupt requests that are pending, so they may be processed in order. Typically, the inner layer sets interrupt requests in an interrupt register as they arise and clears the requests as they are serviced.

Many different interruptions are generated by different modules or functions in a computer system. Typically, different classes of interruptions are defined such as External, Input/Output (I/O), Machine Check, Program, Supervisor Call, and Restart interruptions. Typically, for a particular interrupt request, a corresponding particular interrupt signal is used to set a corresponding particular interrupt bit location in an interrupt register. Also, typically an interrupt mask is used so that certain unwanted interrupt requests are masks from being processed by the interrupt priority encoder. The priority encoder examines the unmasked pending interrupt requests to determine which one has the highest priority and hence which one needs to be serviced next. After the interruption is serviced, the appropriate bit location in the interrupt register is cleared by the hardware.

In prior art systems, once an interrupt request bit is set, control software was not permitted to reset it. The interrupt requests are reset only as a part of a general CPU Reset or as part of an IPL (Initial Program Load).

In prior art systems, interruptions generated by exceptions detected in the software use a different communication method than interruptions generated by hardware. Often there are conflicts in assigning priorities among hardware and software interruptions and consequently, priority encoders have difficulty determining the order that interrupt requests are to be processed. Also, destination units for interrupts in the prior art have serviced the interrupt requests with a fixed order and did not accept any different order thereby limiting the flexibility of the computer system.

In some implementations, interruptions are lost due to the high frequency of the events generating the interrupt requests or due to the low frequency of sampling of the interrupt requests by the priority decoder. Also, if the interruption handler fails, interrupt requests are often lost.

In accordance with the above background, there is a need for improved communications methods in computer system.

SUMMARY OF THE INVENTION

The present invention is a SYStem COMmunication interface (SYSCOM) unit that provides uniform communication between hardware and software units of a computer system. The computer units include Central Processing Units (CPU's), Input/Output Processors (IOP's), Service Processor (SVP), and Control State Software (CSSW). The CPU's in the computer system operate in User State and Control State and the Control State Software (CSSW) runs in a Control State.

The SYSCOM communication interface includes signalling hardware, control blocks in storage, and a uniform communication method used for communication between the computer units.

The communication method for sending messages between an originating unit (ORG.U) and one or more destination unit(s) [DES.U(s)] is as follows:
1. ORG.U obtains a lock associated with the appropriate control block in main storage where the message is to be stored.
2. ORG.U stores its message in the above control block.
3. ORG.U releases the lock obtained in step 1.
4. ORG.U informs SYSCOM communication interface unit of the pending message for DES.U(s). The signal from various ORG.Us has the same format.
5. SYSCOM informs the appropriate DES.U(s). If the DES.U is Control State Software, CSSW is alerted by an interruption on the appropriate CPU.
6. A DES.U obtains the lock for the appropriate control block.
7. The DES.U resets the SYSCOM signal directed to it.
8. The DES.U retrieves the message from the control block. (In special cases, there may be no message on the queue or the queue may be empty. The DES.U handles these cases by going directly to step 10, described below. Furthermore, the DES.U is designed so that it is capable of resuming the operation that it was performing before entering the SYSCOM processes.)
9. The DES.U deletes the message from the appropriate queue.
10. The DES.U releases the above lock.
11. The DES.U sets the SYSCOM signal from SYSCOM if there are more messages in the queue. Otherwise, it leaves the SYSCOM signal to be reset.

In the SYSCOM communication interface, the method of and apparatus for communication between units is the same for all units, both software and hardware. Specifically, the following conditions apply:
1. Signals to a DES.U from SYSCOM are the same regardless of the ORG.U.
2. All units use control blocks in storage as a medium of sending messages to each other.

3. The format of the headers for the control blocks for a particular queue are the same.
4. A message in a DES.U queue can be an interruption, a work request for the destination unit, or another queue.

The SYSCOM communication interface has the ability to inform all DES.Us to look in their queues to see if there are any pending messages. This capability is useful in the event of a failure of SYSCOM's normal signalling mechanism to insure that pending messages are not lost.

In case that a message is sent to any one of multiple DES.Us, such as a floating interruption, the SYSCOM signal is reset after obtaining the lock associated with the appropriate control block. This avoids the possibility of having other DES.Us keep trying to obtain the lock, while there is no need to do so since the floating interruption only needs to be serviced by one CPU.

In SYSCOM, the destination unit is flexible in the order of handling the messages in its queue. It can look through its queue of pending messages and can process any message that is appropriate to be serviced next.

BRIEF DESCRIPTION OF THE DRAWINGS

FIG. 1 depicts a block diagram of a computer system formed of a number of units interconnected by a SYSCOM communication array.

FIG. 2 depicts a block diagram of one signaling module of the SYSCOM communication interface.

FIG. 3 depicts an overall block diagram of a single CPU computer system incorporating the present invention.

FIGS. 7A and 7B depict a block diagram of the I-Fetch data and control circuitry that forms part of the FIG. 3 system.

FIG. 8 depicts a detailed block diagram of the register array complex.

FIG. 9 depicts a block diagram of a multiple CPU system using multiple CPU's of the FIG. 3 type.

FIG. 11 is a flow chart of the method practiced by the invention.

DESCRIPTION OF THE PREFERRED EMBODIMENTS

Overall Computer System—FIG, 1

Figure 4:
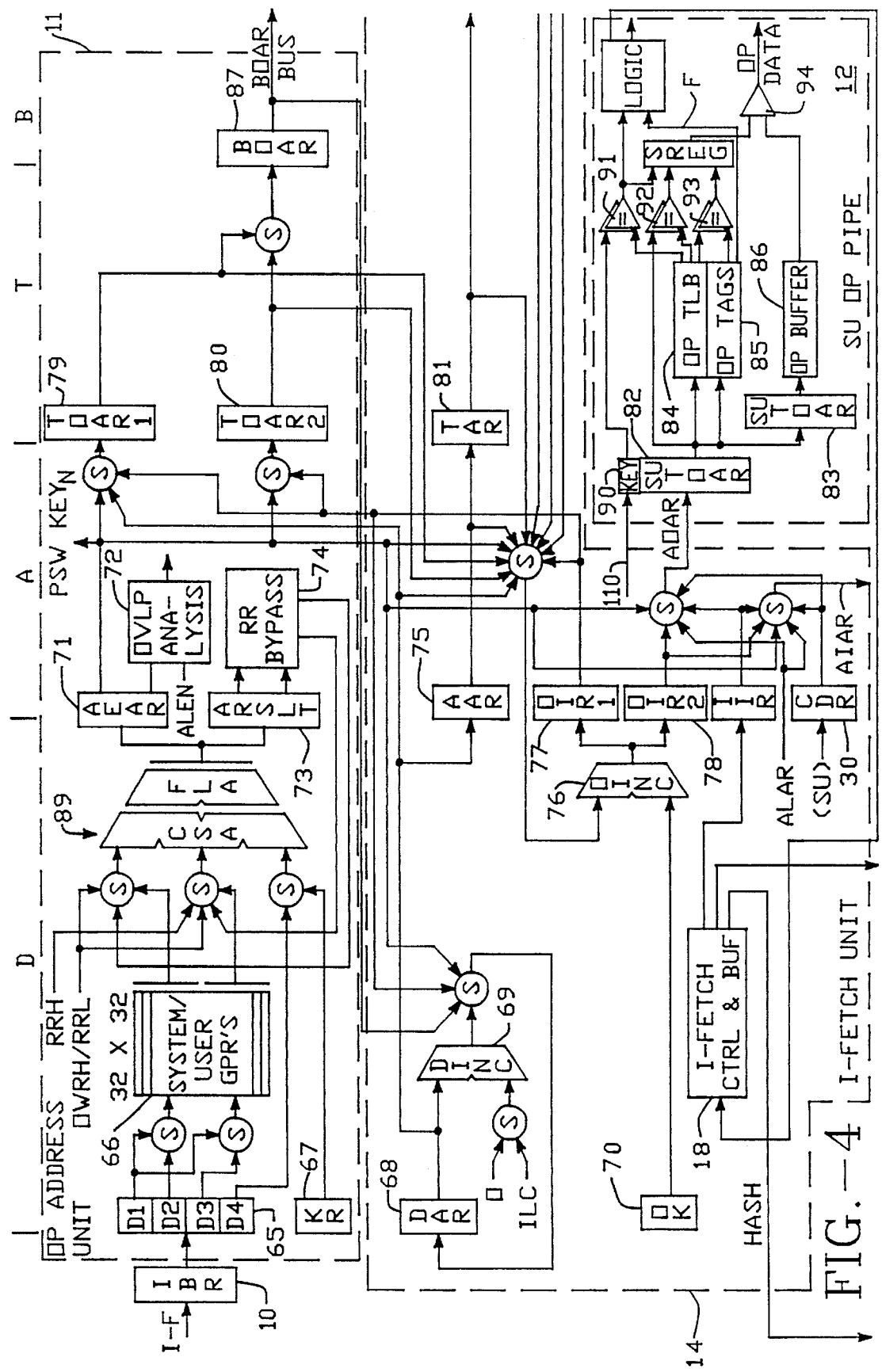
FIGS. 4, 5 and 6depict detailed block diagrams of the FIG. 3 system

In FIG. 1, a computer system compatible with the Amdahl 5995-A computer operating in accordance with the ESA/390 architecture is shown.

The computer system of FIG. 1 includes Central Processing Units (CPU's) 2-0, . . . , 2-n; Input/Output Units (I/O Processors [IOP's]) 9-0, . . . , 9-m; Service Processor (SVP) 6, and Control State Software (CSSW) running on physical CPU's 2-0, . . . , 2-n; storage systems 281 including main store 8 and system control units 7; and including the SYSCOM communication interface 280. In the FIG. 1 system, the communication interface connects all the CPU's, IOP's and the service processor together in a unified manner to provide unified communication between units in the system.

In FIG. 2, one signaling module 280-1 of the communication interface 280 of FIG. 1 is shown. The module 280-1 includes a set (S)/reset(R) latch 282 for signaling interrupt pending from one unit to another, from the CPU 2 to the IOP 9, for example. The module 280-1 includes a set (S)/reset(R) latch 283 for signaling work pending from one unit to another, from the IOP 9 to the CPU 2, for example. Latch 282 is set by operation of IOP 9 and is reset by operation of CPU 2. Latch 283 is set by operation of CPU 2 and is reset by operation of IOP 9. The FIG. 2 module is representative of the connections between all units in the FIG. 1 system.

Single CPU Computer System—FIG. 3

In FIG. 3, a computer system compatible with the Amdahl 5995-A computer operating in accordance with the ESA/390 architecture and suitable for use in the FIG. 1 environment is shown. The computer system of FIG. 3 includes an instruction unit (I-unit) 5, a storage unit (S-Unit) 4, an execution unit (E-Unit) 13, system control units 7, I/O units 9, main store 8, and a service processor 6. The instruction unit 5 includes an operand address unit 11, an instruction data register 10, an I-fetch unit 14, a register array 17, and an I-unit control 3. The storage unit 4 includes an SU Op Pipe 12 and an SU I-Fetch Pipe 15.

The FIG. 3 system features two machine states, User State and Control State. In User State, supersets of the IBM ESA/390 architecture are supported. Some User State operations may be emulated by Control State software. The architecture provides support for Control State Software to implement the "Multiple Domain Facility" (MDF). MDF provides for multiple computing systems to exist in User State on one processor complex. This operation is accomplished by providing each virtual computing system (domain) with its own private main storage, channels, operator console, and optionally expanded storage, while multiplexing all domains on the CPU resources available to the processor complex.

A "Domain" is a set of resources such as CPU's, main storage and channels available to a User State control program (CP). A domain program is a User State program. A domain consists of both domain-native and guest resources. The terms "User", "User State", and "LP (Logical Processor)" also refer to both domain-native and guest resources, although LP usually is used to refer to a domain CPU.

A "Guest" is a resource that requires the presence of a supporting 'host' domain control program. A guest program is one that runs in an environment consisting of a specific set of guest resources. When a CPU operates in guest mode (User State or Control State), domain resources accessed by a program are guest resources (for example, guest PSW) by default. In Control State, access to other resources is under program control which is sometimes called interpretive-execution mode. Domain Mode Control <A> indicates whether a CPU operates in guest mode or not.

"Domain-native" is a resource that does not require the presence of a domain control program. A domain-native program is one that runs in an environment consisting of domain-native resources. A CPU is in domain-native mode if it is not in guest mode; in this mode, domain resources accessed by a program are domain-native resources (for example, domain-native PSW) by default. In Control State, access to other resources is under program control.

A "Host" is a domain program that supports guest resources. The term "host" is meaningful when discussed in the context of a guest. Host resources may behave differently when the CPU is in guest mode. The term "host mode" may sometimes be used interchangeably with "domain-native" mode.

User programs and vendor-provided operating systems run in User State. IBM SCPs run in User State. User State may be in either System/370 or ESA/390 mode. Certain instructions and facilities of User State may be emulated by Control State software (CSSW).

Control State is for controlling system resources and they may be shared by multiple domains and may provide emulation. Emulation is often used for enhancing the IBM ESA/390 architecture or for enabling User State programs that run on one manufacturer's machines to run on another manufacturer's machines. Control State operation is based on the IBM ESA/390 architecture. Entry to Control State from User State is vectored, invoked by Control Interceptions that require assistance by Control State software (CSSW).

Transitions between User State and Control State occur under a number of conditions. For example, transitions occur when an instruction occurs that is defined as an emulated instruction, when an instruction occurs for which a specific interception control is set, when an interruption occurs for which a specific interception control is set, and when an interruption occurs that is defined as a mandatory Control Interception.

In the FIG. 3 system, there are two types of units of operation, the domain unit of operation (DUO) and the machine unit of operation (MUO).

In the FIGS. 1 and 3 system, the System Communication Interface (SYSCOM) provides a means of communication among Control State software and various processing units within a system. These processing units include I/O Processors (IOPs), service processors (SVPs), and CPUs. The means of communication is through passing data in control blocks CB-0 . . . CB-n in the HSA, and informing the recipient via a signaling mechanism.

In FIG. 3, the service processor (SVP) 6 is provided to assist in configuration of the system, machine check handling, operator facilities, and other model-dependent functions.

The FIG. 3 system includes a facility to permit asynchronous communication between TCMPs using messages. The message processing facility and the instructions to support them are collectively known as the TCMP unification facility (TUF). TUF is distinguished from a local area network. The TUF assembles large single system images by linking TCMPs. The resulting complexes are used for transaction processing in large enterprises.

In the FIG. 3 system, the architectural register sets are defined as follows: access registers (AR), floating point registers (FR), general registers (GR), Control State and domain AR MAP registers (MR), register array (RA), and vector registers (VR). Other individual registers, such as the program status word (PSW), are also defined.

Using the GR as an example, the following notation is used to identify subsets of a register set. To specify register x of the set of GRs, the notation GKx is used if x is a number; the notation GR(x) is used if x is a variable (for example, GR(R1) means the general register designated by the R1 operand).

To specify the consecutive bit positions beginning with w and ending with z, the notation <w:z> is used. A string of bits is specified by listing the bits, separated by commas as in <x, w:z, . . . >. To specify bit string y of register x of the set of GRs, the notation GRx<y> or GR(x)<y> is used. Bit string y may consist of only 1 bit. To specify bit string y within field F of register x of the set of GRs, the notation GRx. F<y> or GR(x).F<y> is used. Bit string y may consist of only 1 bit. Bit positions given for y are with respect to the field F (for example, DAC.DABR_ctl<0>\&).

In the FIG. 3 system, the various ones of the architectural registers are implemented in a register array. The registers in the register array are set forth in the following TABLE 1.

TABLE 1

| CPU Register Array | |
|---|---|
| RA NOs. | |
| 0X | Control State General Registers |
| 1X | Control State Parameters |
| 2X | DAC/CI Parameters/Control State VBPA |
| 3X | Control State AR MAP Registers |
| 4X | Domain-Native General Registers |
| 5X | Domain Counters/Domain Parameters |
| 6X | Domain Parameters/Domain VBPA |
| 7X | Domain AR MAP Registers |
| 8X | Domain-Native Control Registers |
| 9X | Domain Parameters |
| AX | Access Registers |
| BX | Access Registers |
| CX | Guest Control Registers |
| DX | Guest Parameters |
| EX | Guest Parameters |
| FX | Reserved for Control State Software |

In FIG. 3, the main Store 8 contains a system storage area where Control State software and the Hardware System Area (HSA) reside, and domain storage area (s), one for each domain. Each storage area is a separate address space, or address dimension, that is, for example, up to 2 giga-byte (GB) in size. Mapping of these address spaces to physical main storage is via blocks of storage that are 2 mega-byte (MB) or larger.

"Expanded Storage". Control State software and domains may each optionally have its own expanded storage. Mapping of Control State or domain expanded storage areas to physical expanded storage is similar to main storage mapping.

"Shared Global Storage". The architecture can support a large single system image that is composed of multiple tightly coupled (i.e., shared main memory) multiprocessors (TCMP). Shared global storage (SGS) permits data to be shared between TCMPs by functionally connecting the SGS to the main storage of each of the TCMPs. A domain in a TCMP can share all or a portion of SGS with a domain in another TCMP. Mapping of domain SGS to physical SGS is similar to the expanded storage and main storage mapping.

In the FIG. 3 system, the register array (RA) Complex 17 includes 256 word registers that are under control of Control State instructions. A specific RA register is identified by an 8-bit operand field in these instructions. Defined RA registers have two identifications: the functional name (for example GR0) and their register offset in the register array (for example RA(C0)). In addition to using one of the RA-manipulation instructions, some RA registers can be accessed directly by unique instructions that manipulate the functional registers (for example domain CRs can be loaded using the LCTL instruction). For such registers, there may be a preference in the means of access. For example, loading the RA copy of the system prefix has no effect on prefixing; the SPX instruction should be used. Note that the RA registers are not necessarily changed by an instruction addressing the register; some (for example the User State Old PSWs) can be changed due to an interruption or CI. The RA contains most architecturally-defined registers and controls, including Control State prefix, domain-native prefix, guest prefix, DAC, feature control bits, general and control registers.

The architectural registers that are not in the same physical register array are listed as follows:

The Control State PSW is not in the RA. The host PSW to be saved in the interpretive-execution mode is also not maintained in the RA; it is saved in the LPSD. (Note that although the domain-native and guest PSWs are provided in the RA for CSSW to inspect and modify, the instruction-address field (bits 33:63) is invalid).

The host GRs 14 and 15 defined to be saved in the interpretive-execution mode are not maintained in the RA; they are saved in the LPSD. (Note that the User State and Control State GRs are in the RA).

There is one set of FRs provided in User State, and they are not contained in the register array.

In FIG. 3, main storage 8 contains (1) a system storage area (SSA) where Control State Software (CSSW) [both instructions and data] resides and where the Hardware System Area (HSA) resides, and (2) domain storage areas (DSA), one for each domain. Mapping of these address spaces to physical main storage is via blocks of storage that are, for example, 2 MB or larger. A domain's storage area is accessed using domain addresses. In User State, addresses are domain addresses of the current domain. In Control State, CPU generated addresses are generally system addresses. However, under the control of the Domain Access Controls register, some operand effective addresses are treated as domain addresses.

In Control State, CSSW can select either User PSW<AS> and PSW<T> to determine the mode of accessing main storage, or it may choose to use another set of three bits to determine the mode of accessing main storage, which can be different from the current one, as specified by the user PSW.

Detailed System—FIGS. 2, 3, 4

In FIGS. 2, 3 and 4, further details of the computer system of FIG. 3 are shown with an orientation as depicted in the lower right-hand corner of FIG. 3. The computer system operates in a pipelining fashion where operation is divided into a number of segments including P, A, T, B, R segments and D, A, T, B, X, and W segments. The units of FIGS. 4, 5, and 6 operate generally over the D, A, T, B, X, and W segments after a current instruction is loaded into the IDR register 65. To load an instruction, the P segment performs priority resolution, the A segment performs instruction address presentation, the T segment performs TLB lookup and cache tag matching, and the B segment loads the current instruction into the IDR register 65.

In FIG. 3, the I-Unit 5 fetches instructions into the instruction data register (IDR) 65 which are to be processed in a pipeline fashion. Up to six instructions, for example instruction $I_1$, $I_2$, $I_3$, $I_4$, $I_5$, and $I_6$ can be processing in the FIGS. 4, 5, and 6.units in the D, A, T, B, X, and W segments.

In FIG. 3, the I-fetch unit 14 fetches instructions and stores them into the IDR 65 and delivers them to the storage unit Op Pipe 12 and the storage unit I-fetch pipe 15 to maintain a flow of instructions to be executed. The units of FIG. 3 cooperate with the register array 17 for controlling the flow of instructions and operands in the pipeline execution of the computer system.

The I-fetch unit 14 pre-fetches each instruction into the instruction data register IDR 65 so that when the D segment commences, the I-fetch unit 14 has finished for the current instruction, for example instruction $I_1$, and is pre-fetching subsequent instructions for example instructions $I_2$, $I_3$, $I_4$, $I_5$, $I_6$ and $I_7$. The I-fetch unit 14 during prefetching interacts with the storage unit 4 during the P, A, T, B, R segments that all precede the D, A, T, B, X, and W segments.

In FIG. 3, the IDR 65 provides information to the operand address unit 11. The operand address unit 11 determines addresses information to be processed by instructions. The addresses of operands are passed to the storage unit of operand pipe 12 which fetches the operands which are to be operated upon and delivers them to the execution unit 13. The execution unit 13 performs arithmetic and logical functions on the operands such as add, multiply, divide, move, or, and shift.

After prefetching, the D segment is the decode cycle for instruction decoding of the instruction in IDR register 65.

The A segment is address presentation for the S-unit 4. The T segment is a translation TLB lookup and cache tag match cycle. The TLB is a translation look-aside buffer. The B segment is the buffer cycle when, if a correct translation occurred in the TLB and if the line of data addressed is in the cache, the data is accessed and latched into the operand word register OWR (46, 49, 52). The X segment is for execution in the E-Unit 13 which takes data from the OWR, executes on the data and places the result in the result register (48, 51, 54). The W segment is for writing the results to the location specified by the instruction, for example, to an internal register in register array 17 or back to main storage 8.

Figure 5:
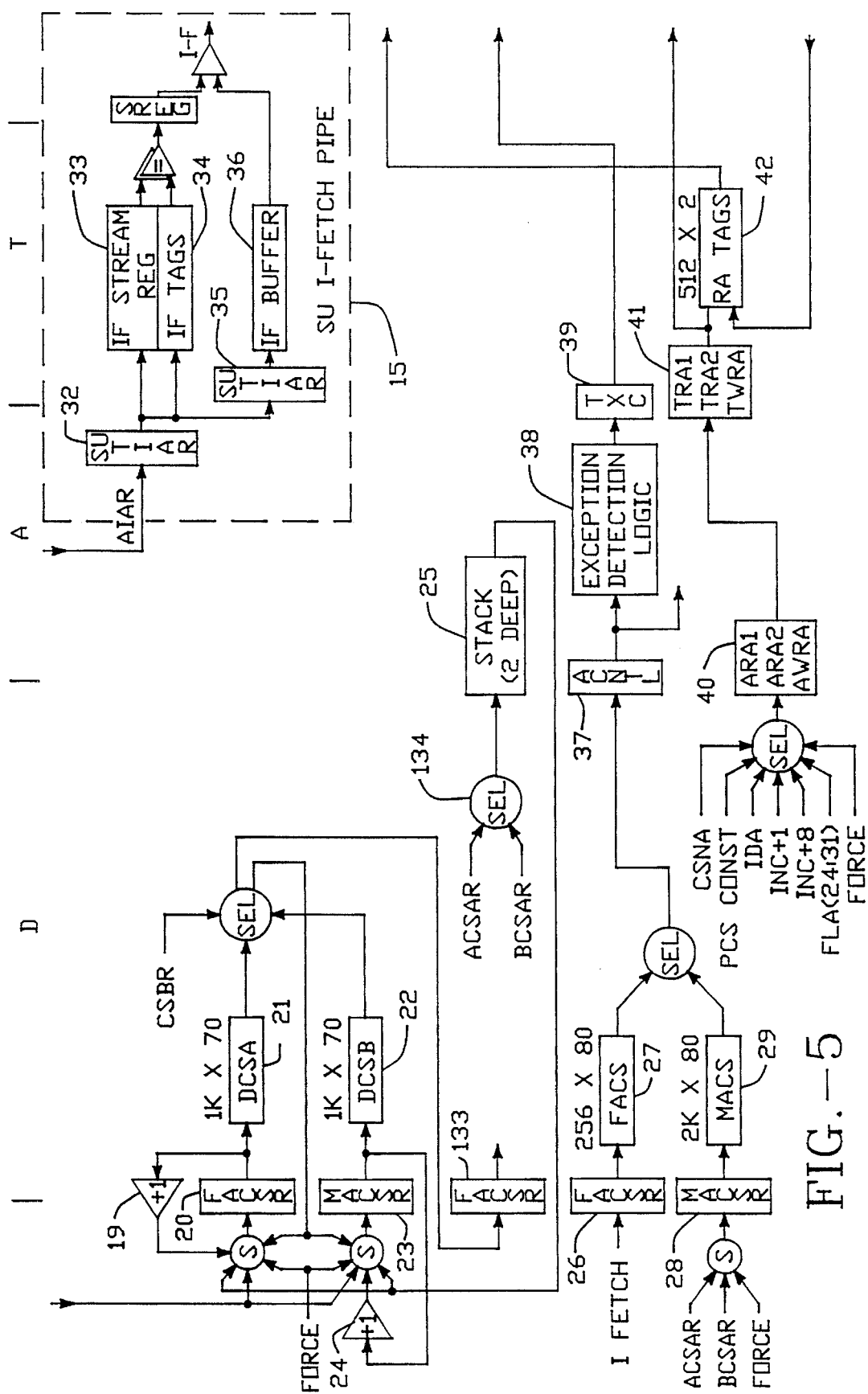
Figure 6:
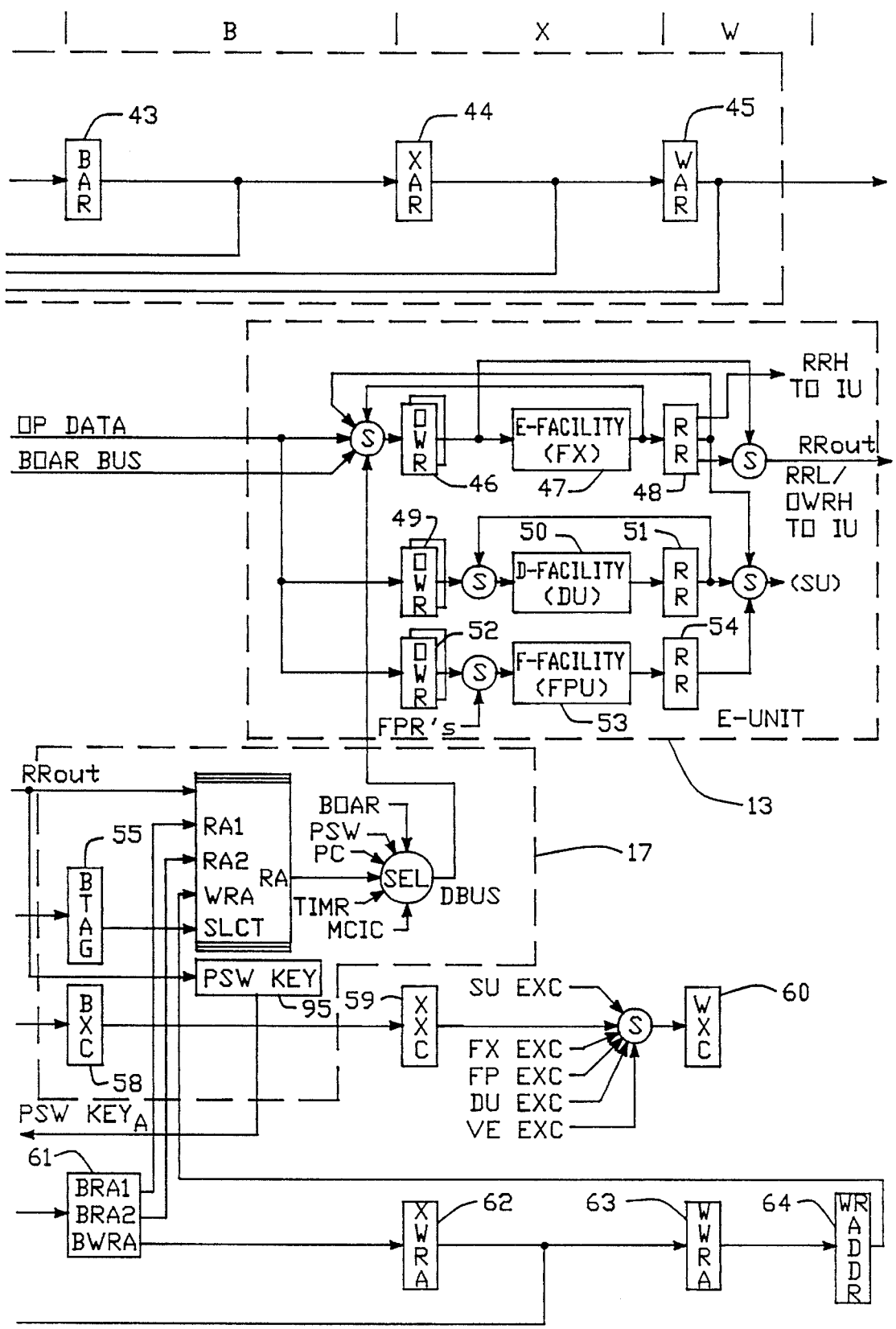

Referring to FIGS. 4, 5, and 6 the instruction buffer register 65 is loaded by the I-fetch unit 14. The instruction buffer register 10 in turn loads the IDR register 65 in four fields, D1, D2, D3 and D4. The contents of the register 65 are selected to read the system or user general purpose registers 66 (GPR's). The contents of the general purpose registers are selected into the three-input adder 89.

After the SPKA instruction is latched into the IDR 65, the data address in the DAR register 68, valid in the D segment, is staged through the address registers in the A, T, B, X and W segments using the registers DAR 68, AAR 75, TAR 81, BAR 43, XAR 44, and WAR 45, respectively. In one alternate embodiment, the registers AAR 75, TAR 81, BAR 43 are eliminated and the equivalent information is obtained from other registers. Conceptually, however, these registers still exist even in the alternate embodiment.

Following the ESA/390 architecture, an operand storage address consists of three components, a base, an index and a displacement. The base, index and displacement values from GPR's 66 are added in adder 89 to form the effective address which is latched into the ARSLT and/or AEAR registers 73 and 71. The adder 89 forms the effective address and it is placed into the AEAR effective address register 71 and into the ARSLT result register 73. The contents of the effective address register 71 are present in the A segment and are used, among other things, as part of the access to the storage unit Op pipe 12 to obtain an operand from the storage unit. The contents are also stored into the T operand address registers 1 and 2, TOAR1 79 and TOAR2 80 in the T segment. The contents of one of the registers 79 or 80 are passed to the B segment operand address registers, BOAR 87. The storage unit Op pipe 12 includes a register 90 which is loaded with the PSW Key which is to be used for key protection checking when the storage unit is accessed. The key from the register 90 is compared in comparator 91 with a key from the OP TLB unit 84 to determine if a key match exits. The other portions of the TLB including the OP tags 85 and OP buffer 86 are also compared in comparator 92 to generate a TLB MATCH signal. If the key match from comparator 91 is not asserted, meaning that the key from register 91 does not match the key from the TLB unit, then the TLB match signal is not asserted meaning that a protection key violation has occurred. If the keys do match and all the other required matches are also present, the TLB match signal is asserted indicating that, among other things, no key protection violation has occurred.

If the instruction being processed is a SPKA instruction, for example, then the processing during the X segment will cause a new PSW including a new PSW Key$_N$ to be stored through the RR result registers 48, 51 and 54 to the register array complex 17. The PSW will be loaded directly into the register array 56 and also will be stored into the PSW Key shadow register 95. The PSW register 95 holds a duplicate copy of PSW Key stored in the register array 56.

Once the D-cycle of a SPKA instruction is complete, the effective address latched in the AEAR register 71 will be moved down the pipeline to provide a new PSW$_N$ in the W segment provided nothing prevents the new PSW$_N$ from being written.

Figure 7A:
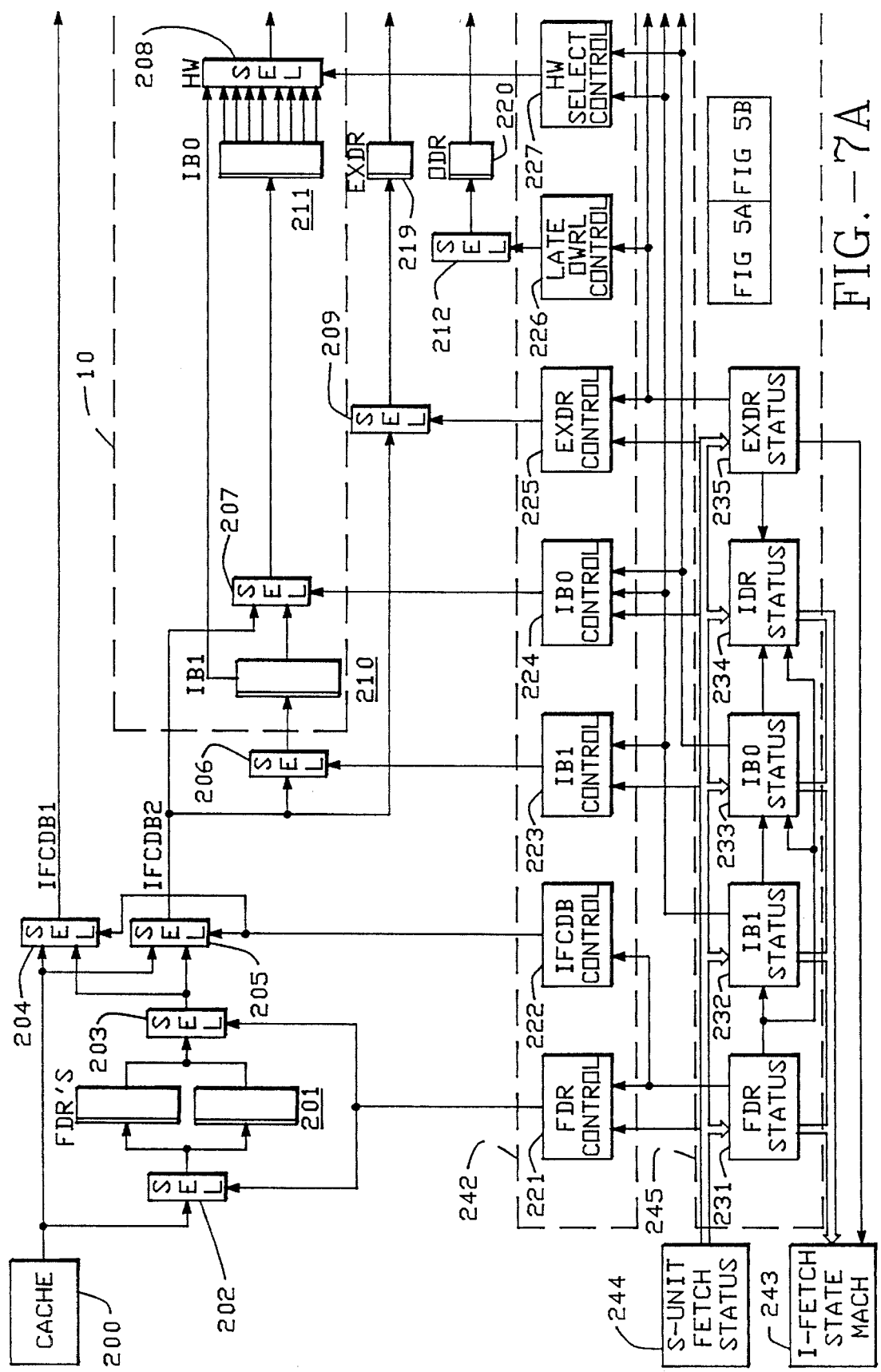

Instruction Fetch Platform—FIG. 7

In FIG. 7, further details of the I-Fetch Unit 14 of FIG. 3 are shown. In FIG. 7, the IDR Register 65 of FIG. 3 is expanded and is shown together with the circuitry for loading the IDR 65 with a sequence of instructions such as shown in TABLE A above.

In FIG. 7, the IDR 65 is loaded from the storage unit cache 200 or the FDR's 201. Selection of instructions into the FDR's 201 is under control of the selector 202 which in turn is controlled by the FDR control 221. Selection of instructions from the cache 200 or the FDR's 201 is under control of the selection gates 204 and 205 which in turn are controlled by the IFCDB control 222. Selection of instructions from the FDR's 201 is under control of the selection gate 203 which in turn is controlled by the FDR control 221. Selection gate 206 controls selection of the selected output of selector 205 into the IB1 buffer register 210. Selector 206 is under the control of the IB1 control 223. The selection from the buffer register IB1 or from the selector 205 is under control of the selector 207 which in turn is controlled by the IB0 control 224. The selected instruction selected by selector 207 is latched in the buffer register IB0 211. Selection of the contents of the IB0 register 211 by selector 208 is under control of the HW select control 227 and selector 208 in turn feeds the selector 213 which is under control of the IFDB control 228. The output from selector 213 or from the cache through selector 204 is under control of selector 214 which in turn is controlled by the IDR select control 229. The selected instruction from selector 214 is input to the IDR 65 which is staged through the IDR 65 stages IDR, AIDR, TIDR, BIDR, XIDR, WIDR, and ZIDR labeled 65-1, 65-2, 65-3, 65-4, 65-5, 65-6 and 65-7, respectively. The output form the ZIDR stage of the IDR 65 is selected by the selectors 237 and 238 is the DBUS of the Op Address Unit of FIG. 3.

In FIG. 7, a decoder 270 decodes the instruction length count, ILC, from the instruction in the D-segment instruction data register (IDR). The ILC is latched into the AILC register 271 and staged to the TILCR register 272 for the T-segment. The T-segment ILC, TILC, is added in adder 273 to the contents of the BNSIAR register 275 to form the next sequential instruction address (NSIA) which is stored back into the BNSIAR register 275. When a branch or other condition (BR) indicates that the next instruction in the sequence determined by adding the ILC to the current instruction is not the next instruction, the BNSIAR is loaded directly from the BOAR 87 of FIG. 3 under control of selector 274. The B-segment next sequential instruction address, BNSIA, is determined one instruction flow ahead of the current instruction in the pipeline. The BNSIA in the BNSIAR is a predicted value based on instruction length count.

In FIG. 7, control of the selection of which instructions to feed into the IDR register 65 is under the selection controls 221 through 229 in control unit 242. These controls receive status information from status unit 245 which is loaded by the S-unit Fetch Status 244. Status unit 245 also provides status to the IFETCH state machine 243. The S-unit Fetch Status 244 loads the FDR status 231, IB1 status 232, IB0 status 233, IDR status 234, EXDR status 235 and the BUBBLE UP STATUS 236 in the status unit 245. The different status and control conditions and related circuits for a main frame computer are extensive, and many of the details related thereto are not relevant to the present invention, but such details can be found, for example, in the Amdahl 5995-A computers. The particular control and status conditions which are relevant for selecting instructions in connection with the present invention will be described in detail hereinafter.

Register Array Complex—FIG. 8

In FIG. 8, further details of the register array complex 17 of FIG. 3 are shown. In FIG. 8, the ram complex 281 is like that shown in the above-identified cross-referenced application entitled MEMORY HAVING CONCURRENT READ AND WRITING FROM DIFFERENT ADDRESSES. The PSW register uses the same data in lines DI_H and DI_L which are the RRH and RRL lines, RRout, from the result register. Similarly, the read address lines RA_1 and RA_2, the write address lines WRA, the even and odd write strobes WR_EVE and WR_ODD, and the control lines CTRL are as shown in the cross-referenced application. The selectors 282 and 283 are like the selectors 24 and 25 in FIG. 4 of the cross-referenced application with the addition of the PSW inputs.

The RAM complex 17 can concurrently read and write to different addresses. As described in detail in the cross-referenced application, the RAM complex includes two RAMs, each having an address selector. The RAM complex includes a data out multiplexer for selecting outputs from one of the RAM's. The RAM complex includes a tag array storing an array of tag bits, one for each address in the RAM's. The tag bits are used to control the address selectors and multiplexer.

A single bit tag is provided in the tag array for each entry in the RAM's. The tag marks which one of the two RAM's has the valid data for the corresponding specific address tag. During a RAM read cycle, the tag routes the read address through the address selector for the correct one of the RAM's. The correct RAM is read using the read address and a staged copy of the tag controls the data out selector to select data from the correct RAM for the data out bus.

During a concurrent read and write cycle, the tag selects the read addresses for one RAM and selects the write address for the other RAM. A write enable signal, is provided for the write RAM. The tag for the write address is then updated in the tag array to point to the write RAM.

With the ability to read and write concurrently to different addresses, enhanced performance results by using only a single operation to concurrently read and write to the same address in the RAM complex.

Multiple CPU System—FIG. 9

In FIG. 9, a multiple CPU embodiment of the FIG. 3 system is shown. The FIG. 9 system includes a service processor 6, I/O Unit 9, a main store 8, system control unit 7 and a plurality of CPU's including CPU(0), . . . , CPU(n-1). Each of the CPU's includes a register array including the register arrays RA(0), . . . , RA(n−1). The register arrays in each of the CPU's of FIG. 9 are like the register array complex 17 of FIG. 3 and of FIG. 8.

Each register array RA(0), . . . , RA(n−1) in the CPU's of FIG. 9 includes 256 word registers that are under control of Control State instructions. A specific RA register is identified by an 8-bit operand field in these instructions. Defined RA registers have two identifications: the functional name (for example GR0) and their register offset in the register array (for example RA(C0)). In addition to using one of the RA-manipulation instructions, some RA registers can be accessed directly by unique instructions that manipulate the functional registers (for example domain CRs can be loaded using the LCTL instruction). For such registers, there may be a preference in the means of access. For example, loading the RA copy of the system prefix has no effect on prefixing; the SPX instruction should be used. Note that the RA registers are not necessarily changed by an instruction addressing the register; some (for example the User State Old PSWs) can be changed due to an interruption or Control Interception (CI). Each RA contains architecturally-defined registers and controls, including Control State prefix, domain-native prefix, guest prefix, DAC, feature control bits, general and control registers.

The Control State PSW is store in the PSW register in the RA complex as described in connection with FIG. 8. The host PSW to be saved in the interpretive-execution mode is saved in the storage data block (SDB) of main store 8. The host GRs 14 and 15 defined to be saved in the interpretive-execution mode are also saved in the SDB. The User State and Control State GRs are in the RA's.

In main storage 8, the system storage area (SSA) stores the Control State Software (CSSW) [both instructions and data] and the Hardware System Area (HSA), and (2) domain storage areas (DSA), one for each domain. Mapping of these address spaces to physical main storage is via blocks of storage and a domain's storage area is accessed using domain addresses. In User State, addresses are domain addresses of the current domain. In Control State, CPU generated addresses are generally system addresses. However, under the control of the Domain Access Controls register, some operand effective addresses are treated as domain addresses.

In Control State, CSSW can select either User PSW<AS> and PSW<T> to determine the mode of accessing main storage, or it may choose to use another set of three bits to determine the mode of accessing main storage, which can be different from the current one, as specified by the user PSW.

Figure 10:
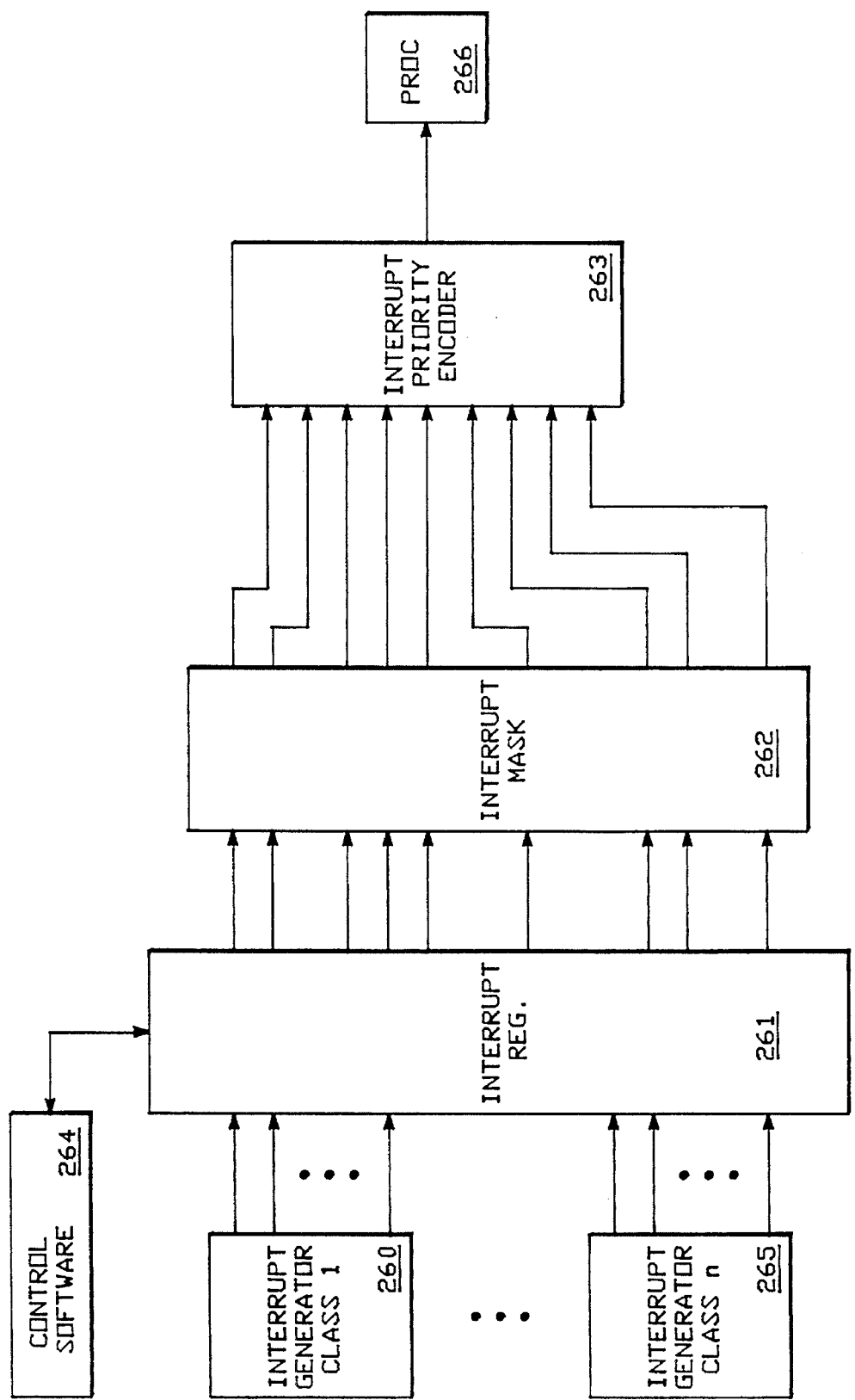
FIG. 10 depicts a block diagram of the software controlled interrupt unit.

Interrupt Unit—FIG. 10

In FIG. 10, the interrupts are generated in the machine of FIG. 3 with different classes 1, 2, . . . , n as represented by interrupt generators 260, . . . , 265. The interrupt generators 260, . . . , 265 are the conventional hardware interrupt generators of the FIG. 3 system. The interrupts are stored into the interrupt registers 261 and are output through the interrupt mask 261 to the interrupt priority encoder 263 which enables the interrupt processor 266. The interrupt processor 266 is the conventional hardware in the FIG. 3 system for processing interrupts. In FIG. 10, the control software 264 is able to write directly into the interrupt register 261 thus enabling both the hardware interrupt requests from generators 260, . . . , 265 and software generated interrupts from control software 264 to be handled in a common, unified manner.

Examples of the operation of the FIG. 10 unit and the FIG. 3 system are given in the following TABLE 2.

TABLE 2

| Control State | User State |
|---|---|
| Receive request for Interrupt Key interruption (rupt) | |
| Check User State masks | |
| If enabled, perform software simulation of rupt | |
| Return to User ----> | |
| If disabled in PSW, set up monitoring of PSW | |
| If disabled in CR, set up monitoring of CR | |
| Return to User State ----> | |
| | Execute |
| | <----Enable for rupt |
| Verify enable state of User | |
| If enabled, perform software simulation of rupt | |
| Return to User ----> | |
| Receive Request for Interrupt Key | |
| Set DPIR bit in RA | |
| Return to User ----> | |
| | Execute |
| | Enable for rupt Hardware deliver rupt |

In TABLE 2, various operations are performed by control state software using the register array complex 17 of FIG. 3 which is directly accessable by control state software 264. One particular register in array complex 17 used in the Control State by control state software is, by way of example, the Domain Pending Interruption Register (DPIR) which is register 58 in the TABLE 1 register complex array.

The Domain Pending Interruption Register (DPIR) enables control state software (CSSW) to manipulate and monitor User State PER, Address Compare, and certain external and repressible machine check interruption conditions. The DPIR register stored by an RA instruction indicates whether any of the associated domain interruptions is pending. An RA instruction that loads a DPIR bit with 0 effectively clears the associated pending interruption. An RA-instruction that loads a DPIR bit with one effectively creates the associated pending interruption.

In User State, certain CPU-specific interruption conditions (External, I/O, and Repressible Machine Check DPIR Controls) are defined to be pending for the logical processor (LP) when the bit in the DPIR associated with the condition is 1. When the LP becomes enabled for such interruptions, as defined in the IBM ESA/390 architecture, the interruption occurs and the associated DPIR bit is set to 0. These DPIR bits are set either by the CPU upon detection of the associated event, or by CSSW in Control State.

The following DPIR bits are set only by CSSW: MA, IK, TS, TF, ED, TD, SV, VF. The IT bit may be set by CSSW and is always set by the CPU in System/370 User State when an interval timer interruption condition is recognized. In User State, if the LP is enabled for the associated event, an interruption will occur and the DPIR bit is set to 0. The DPIR PI bit is provided as a read-only array of any MP synchronization conditions or any pending store PER, external, I/O, repressible machine check or stop interruption conditions that exist for the LP. It may be read by CSSW and will accurately reflect whether (PI=1) or not (PI=0) there are any MP synchronization conditions or any pending store PER, external, I/O or Repressible Machine check or stop interruptions for the LP. This includes both Control State and User State pending interruptions. Control State interruptions that are indicated by the PI bit have been conditioned by the appropriate USSIM bit. Setting the bit with an RA instruction has no effect on LP operations. The DPIR<PI> bit is used to monitor interruptions that become pending during the emulation of an interruptible instruction. The PI bit reflects the interruption status at the time that it is stored. A conceptually prior interruption condition, caused by a preceding instruction, such as setting the CPU Timer with a negative value, may or may not be indicated by the PI bit.

SYSCOM Communication Array

The Computer system Communication Interface (SYSCOM) provides a means of communication among Control State software (CSSW) and various processing units within a TCMP system. The processing units are referred to as processors for simplicity, and include the IOP's 9, SVP 6, CPU's 2 as described in connection with FIG. 1. The means of communication is through passing data in control blocks CB-0 ... CB-n in the HSA, and informing the recipient via a signaling mechanism.

The general mechanism of communication includes a general SYSCOM control block format, the LOCK instruction, a signaling mechanism, queues (one form of SYSCOM control blocks), types of accesses to queue elements, queueing functions, and locking protocols involving queues.

The present invention is a SYStem COMmunication interface (SYSCOM) unit that provides uniform communication between hardware and software units of a computer system. The computer units include Central Processing Units (CPU's), Input/Output Processors (IOP's), Service Processor (SVP), and Control State Software (CSSW). The CPU's in the computer system operate in User State and Control State and the Control State Software (CSSW) runs in a Control State.

The SYSCOM communication interface includes signalling hardware, control blocks in storage, and a uniform communication method used for communication between the computer units.

Referring to FIG. 11, the communication method for sending messages between an originating unit (ORG.U) and one or more destination unit(s) [DES.U(s)] is as follows:

601. ORG.U obtains a lock associated with the appropriate control block in main storage where the message is to be stored.
602. ORG.U stores its message in the above control block.
603. ORG.U releases the lock obtained in step 1.
604. ORG.U informs SYSCOM communication interface unit of the pending message for DES.U(s). The signal from various ORG.Us has the same format.
605. SYSCOM informs the appropriate DES.U(s). If the DES.U is Control State Software, CSSW is alerted by an interruption on the appropriate CPU.
606. A DES.U obtains the lock for the appropriate control block.
607. The DES.U resets the SYSCOM signal directed to it.
608. The DES.U retrieves the message from the control block. (In special cases there may be no message on the queue or the queue may be empty. The DES.U handles these cases by going directly to step 10, described below. Furthermore, the DES.U is designed so that it is capable of resuming the operation that it was performing before entering the SYSCOM processes.)
609. The DES.U deletes the message from the appropriate queue.
610. The DES.U releases the above lock.
611. The DES.U sets the SYSCOM signal from SYSCOM if there are more messages in the queue. Otherwise, it leaves the SYSCOM signal to be reset.
612. END if there are no more messages in the queue.

In the SYSCOM communication interface, the method of and apparatus for communication between units is the same for all units, both software and hardware. Specifically, the following conditions apply:

1. Signals to a DES.U from SYSCOM are the same regardless of the ORG.U.
2. All units use control blocks in storage as a medium of sending messages to each other.
3. The format of the headers for the control blocks for a particular queue are the same.
4. A message in a DES.U queue can be an interruption, a work request for the destination unit or another queue.

The SYSCOM communication interface has the ability to inform all DES.Us to look in their queues to see if there are any pending messages. This capability is useful in the event of a failure of SYSCOM's normal signalling mechanism to insure that pending messages are not lost.

In case that a message is sent to any one of multiple DES.Us, such as a floating interruption, the SYSCOM signal is reset after obtaining the lock associated with the appropriate control block. This avoids the possibility of having other DES.Us keep trying to obtain the lock, while there is no need to do so since the floating interruption only needs to be serviced by one CPU.

In SYSCOM, the destination unit is flexible in the order of handling the messages in its queue. It can look through its queue of pending messages and can process any message that is appropriate to be serviced next.

1. SYSCOM Control Block Format

The general format of a SYSCOM control block is depicted below. Some SYSCOM control blocks do not need to be locked in these control blocks, the lock-word field is not defined and may be used to contain control-block-specific information. The block format is as follows:

```
Word 0       LOCK WORD
WORD 1       BID
WORD 2
  •
  •
  •
```

The functions of each field are:
1. Lock Word
The lock work allows a control block to be locked. A lock word has the following format:

```
              BID-Block Identifier
| Current Lock | Previous Lock | Time Stamp | Lock Flags |
 0              8               16           24          31
```

Current Lock:

Bit 0 is one if locked; zero if unlocked. When a lock is successfully obtained, bits 0:23 are updated; when a lock is release, bits 1:23 are left unchanged.

Bits 1:2 may be used by the locking entity to indicate the reason for locking. The coding of the reasons is control block dependent.

Bits 3:7 indicate who currently has the lock, if bit 0 is one. If bit 0 is zero, this field indicates who previously held the lock. Codes are defined in Table 18, "Locking Entity Code". Reserved code must not be used in the lock word; using a reserved code may produce unpredictable results.

Notes on Code Assignment

| Most Significant 3 bits of Code: | Meaning |
|---|---|
| 01x | The owner of the lock is a CPU. The least significant 3 bits shows the CPU address. |
| 11x | The owner of the lock is the CSSW running on a CPU. The least significant 3 bits of the code implies the CPU address. |
| 000 | The owner of the lock is the SVP, or the code is Reserved. |
| 001 | The owner of the lock is a Channel Manager. The least significant 2 bits indicate the Channel Manager number. |

TABLE 18

Locking Entity Code

| Code (Hex) | Code (Binary) | Locking Entity |
|---|---|---|
| 00 | 0 0000 | Reserved (Not to be assigned) |
| 01 | 0 0001 | Reserved |
| 02 | 0 0010 | SVP |
| 03 | 0 0011 | Reserved |
| 04 | 0 0100 | Channel Manager 0 |
| 05 | 0 0101 | Channel Manager 1 |
| 06 | 0 0110 | Channel Manager 2 |
| 07 | 0 0111 | Channel Manager 3 |
| 08 | 0 1000 | CPU 0 |
| 09 | 0 1001 | CPU 1 |
| 0A | 0 1010 | CPU 2 |
| 0B | 0 1011 | CPU 3 |
| 0C | 0 1100 | CPU 4 |
| 0D | 0 1101 | CPU 5 |
| 0E | 0 1110 | CPU 6 |
| 0F | 0 1111 | CPU 7 |
| 10-17 | 1 0xxx | Reserved |
| 18 | 1 1000 | CSSW Running on CPU 0 |
| 19 | 1 1001 | CSSW Running on CPU 1 |

TABLE 18-continued

Locking Entity Code

| Code (Hex) | Code (Binary) | Locking Entity |
|---|---|---|
| 1A | 1 1010 | CSSW Running on CPU 2 |
| 1B | 1 1011 | CSSW Running on CPU 3 |
| 1C | 1 1100 | CSSW Running on CPU 4 |
| 1D | 1 1101 | CSSW Running on CPU 5 |
| 1E | 1 1110 | CSSW Running on CPU 6 |
| 1F | 1 1111 | CSSW Running on CPU 7 |

Previous Lock:

This field contains the previous contents of the current-lock field when the lock is successfully obtained.

Time Stamp:

Time indicating when lock is obtained.

Lock Flags:

Bit 0 is defined as the "Quiesce Processing Bit". When one, it indicates that the system has entered quiesce processing as part of I/O recovery execution.

Bits 1:7 are reserved and should be set to zero.

2. BID

BID is the control block identifier. The BID implies the actual format and functions of the control block. This field is defined for all control block types. Defined values are as follows:

TABLE 19

BID Assignment

| BID (hex) | Control Block Type |
|---|---|
| 00 | Reserved (Not to be used) |
| 01 | Work Queue Header (WQH) |
| 02 | Interrupt Queue Header (IQH) |
| 03 | Control Unit Control Block (CCB) |
| 04 | Channel Set Control Block (CSCB) |
| 05 | Busy Queue Header (BQH) |
| 06 | Logout Queue Header |
| 07 | CRB, CRW Control Block |
| 08 | Subchannel Control Block (SCB) |
| 09 | Channel Control Block (CHCB) |
| 0A | Channel Path Status Control Block (CPSB) |
| 0B | Address Dimension Subchannel Map (ADSM) |
| 0C | Address Dimension CCB Map (ADCUM) |
| 0D | Address Dimension Channel Path Map (ADCPM) |
| 0E | Channel Configuration Information Block (CCIB) |
| 0F | Address Dimension Channel Configuration (ADCC) |
| 10 | Address Dimension I/O Configuration Directory (ADIOCD) |
| 11 | Address Dimension Channel Path ID (ADCPID) |
| 12 | Address Dimension Device (ADDEV) |
| 13 | Address Dimension Logical Control Unit (ADLCU) |
| 14 | Address Dimension Physical Control Unit (ADPCU) |
| 15 | Error Queue Header |
| 16 | Interrupt Queue Header Extension Area |
| 17 | Busy Queue Header Extension Area |
| 18-1F | Reserved for I/O |
| 20 | SIGP Control Block |
| 21 | Recovery Machine Check (RMC) Control Block |
| 22 | Domain Service Signal Control Block |
| 23 | Miscellaneous-Machine-Check Control Block |
| 24 | MCAI Header |
| 25 | MCAI Control Block |
| 26 | Zone Expanded Storage Control Block (ZEPCB) |
| 27-2E | Reserved |
| 2F | Reserved for Mailbox CB if needed |
| 30 | Queue Header for Recovery Queue Initiated by CSSW |
| 31 | Queue Header for Normal Queue Initiated by CSSW |
| 32 | Queue Header for Low Priority Queue Initiated by CSSW |
| 33 | Queue Header for Response Queue Initiated by CSSW |

TABLE 19-continued

BID Assignment

| BID (hex) | Control Block Type |
|---|---|
| 34 | Queue Header for Recovery Queue Initiated by SVP |
| 35 | Queue Header for Normal Queue Initiated by SVP |
| 36 | Queue Header for Response Queue Initiated by SVP |
| 37 | Request/Response CB (RRCB) Initiated by SVP |
| 38 | RRCB Initiated by CSSW |
| 39-3F | Reserved for SVP/CSSW Interface |
| 40 | HSA Directory |
| 41 | Store Status Data Block |
| 42 | Extended CPU Information |
| 43 | Default CIIB Page |
| 44 | Bad Page Table |
| 45 | Diagnose Parameter List |
| 46 | IML Lock |
| 47-BF | Reserved |
| C0-FF | Reserved for CSSW |

2. Locking And Unlocking A SYSCOM Control Block

A control block is locked when bit 0 of the lock word is 1; the LOCK instruction below is provided for Control State Software to lock a SYSCOM control block. The control block is unlocked by resetting bit 0 of the lock word to 0; no special instruction is provided to release the lock.

2.1 LOCK Instruction

```
LOCK    D1(B1), I2      {S1}
```

| 'B0' | I2 | B1 | D1 |
|---|---|---|---|
| 0 | 8 | 16 | 20   31 |

An attempt is made to lock the lock word at the first operand location. If the lock is available (lock work <0>=0), bit 0 of the lock word is set to 1, the reason code (bits 1:2) is replaced by bits 6:7 of the immediate operand, and bits 3:7 are set to the code of the locking entity (x'18'–x'1F', depending on which CPU executes the instruction). In addition, the previous lock field (bits 8:15) of the lock word is set to the old contents of bits 0:7 of the lock word; the time stamp field is set to the current time (the current value of the lock-timestamp timer). bits 24:31 of the lock word remain unchanged. The fetch of bit 0 of the lock word for purposes of determining whether the lock is available and the store into the lock word at the first operand location appear to be a block-current interlocked-update reference as observed by other processors. Note that key protection applies to the access to the first operand.

If the lock is unavailable (lock word <0>=1), a nonzero condition code is set based on whether a timeout has occurred. A timeout occurs if the difference between the current time and the time stamp, ANDed with an 8-bit mask, produces a nonzero value. The mask is formed by appending bits 0:5 of the immediate operand with b'00'. The current time is provided by an 8-bit timer; the rate at which the timer increments is model-dependent.

Programming Note: The timeout threshold is programmable by setting bits 0:5 of the immediate operand appropriately. For example, if the timer increments every 32 ms, setting a mask of b'111100xx' provides a timeout threshold of about half a second.

5995M: The 5995M lock-timestamp timer increments every 16.384 ms (i.e., it wraps approximately ever 4.2 seconds). The timer is independent of the ROD clock. It stops when the system-gated clock is stopped.

The first operand must be designated on a word boundary. Otherwise, a specification exception is recognized.

The instruction is valid only in Control State.
The instruction sets the condition code as follows.
Resulting Condition Cold:
0—The requested lock has been successfully obtained.
1—(undefined)
2—The lock is not available and not yet timed out. The program may reissue the instruction.
3—The lock is not available and timeout has occurred. The program should initiate recovery procedures.
Program Exceptions:
Operation (User State)
Access (operand 1)
Specification (operand 1, alignment)
3. Signaling
3.1 Signaling SYSCOM
Control State software signals SYSCOM using the SIGSYS instruction defined below:

```
SIGSYS    RA1, D2(B2)      {AS}
```

| 'AB' | RA1 | B2 | D2 |
|---|---|---|---|
| 0 | 8 | 16 | 20   31 |

The SYSCOM is signaled to perform a transaction. In general, this results in the status maintained by SYSCOM for the designated queue, interruption, or control block being updated. some recipients associated with the designated object are then informed of the new status. The object and the new status are indicated by a combination of the two operands, which have the format shown below.

The second operand address is not used to access storage; bits 27:31 of the address specify the opcode as follows:

| //////////////////////////////// | Sopcd |
|---|---|
| 0 | 27   31 |

The RA register designated by the RA1 field contains:

| ////////// | //// | Sd1 | //// | Sd2 | //// | Sd3 |
|---|---|---|---|---|---|---|
| 0 | 8 | 1 1 1<br>3 5 6 | | 2 2 2<br>1 3 4 | | 2 3<br>9 1 |

Explanation:

Sopcd - SYSCOM opcode

Sd1 - SYSCOM data 1

Sd1 - SYSCOM data 2

Sd1 - SYSCOM data 3

//// - ignorec

The interpretation of the SYSCOM data is dependent on the type of transaction specified by the SYSCOM opcode.
The instruction is valid only in Control State.
Condition Code: The code remains unchanged.
Program Exception
Operation (User State)
Programming Note:
1. SIGSYS may be used to turn off a SYSCOM bit (and the corresponding signal) only if the corresponding control block (CB) or queue has been locked. (The external address compare transaction is exempted from this rule since there is no corresponding CB.) Otherwise, due to a lost update, the SYSCOM bit is set to 0 although it should have been 1. This may result in unpredictable operation.

2. When a receiver inspects a CB due to a SYSCOM signal, it may be advantageous to temporarily turn off the triggering SYSCOM signal immediately after locking the CB if all of the following conditions are true:

There may be more than 1 receiver receiving the SYSCOM signal.

All the receivers will be competing to lock the same CB.

Turning off the SYSCOM signal is much faster than processing the CB and eventually setting the proper SYSCOM signal.

Note that at the end of processing the CB, the SYSCOM signal must be set to its proper state. (Resetting may be omitted if it has already been done when the lock is obtained.)

This procedure eliminates having one or more receivers who have received the SYSCOM signal spin waiting for another receiver to release the lock, provided the receiver who finds the lock busy, abandons the spin (even without a timeout) if the triggering SYSCOM signal is no longer on.

3. Signaling to turn on a SYSCOM bit does not require locking the corresponding control block and can be performed immediately after the lock is released (which was preceded by updating the control block). This eliminates having one or more receivers who have received the SYSCOM signal spin waiting for the sender to release the lock. This assumes that a receiver is able to handle a void SYSCOM signal (i.e., a signal that causes the receiver to inspect an empty queue, or a control block with no pending interruption).

TABLE 20

Summary of SIGSYS Operand Encoding by Transaction Type

| Transaction | Opcode (hex) | | SYSCOM Data | | |
|---|---|---|---|---|---|
| Type | reset | set | Sd1 | Sd2 | Sd3 |
| I/O_Rupt | 00 | 08 | Did | Act | ISC |
| IOP_Queues | 01 | 09 | Qid | Act | QTa |
| Mail_Box | 02 | 0A | Mty | Act | TCA |
| Misc_Rupt1 | 03 | 0B | Did | Act | ITa |
| Misc_Rupt2 | 03 | 0B | ITb | Act | x'7' |
| SVP/CSSW | 03 | 0B | QTb | Act | x'4' |
| Ext_Call | 04 | 0C | Did | Act | TCA |
| Emg_Signal | 05 | 0D | Did | Act | TCA |
| ISC_Mask | 10 | 11 | x'0' | x'0' | ISC |
| Configuration | — | 12 | Did | x'0' | LPA |
| Load_SSR1 | — | 1E | REB | x'0' | A |
| Load_SSR2 | — | 1F | x'0' | x'0' | SPO |

Explanation for the SYSCOM Data Fields:

Valid values for the data fields are defined in the explanation below. Using undefined values results in unpredictable operation.

A: The contents of this field are loaded into SSR<5:7>. Valid values are 0–7.

Act: Activity code. This field is used for tracing purposes to indicate action performed on a control block. The code is to be defined.

Did: Domain number. Valid values are 0–7, with 0 indicating Control State.

ISC: Interruption subclass code. Valid values are 0–7. For I/O-Rupt transactions, if Did=x'0', ISC is irrelevant ITa: Interruption type (a). Valid values are defined below:

TABLE 21

Interruption Type Encoding for Misc_Rupt Transactions

| ITa | Interruption Type |
|---|---|
| 0 | System Recovery |
| 1 | Channel Report Pending |
| 2 | Channel Subsystem Damage |
| 3 | Service Signal |
| 5 | External Damage |

ITb: Interruption type (b). Valid values are defined below:

| ITb | Interruption Type |
|---|---|
| 0 | Degradation |
| 1 | External Address Compare |

LPA: Logical processor address. Valid values are 0–7.

Mty: Mty<0> identifies the message type:

0—solicited *

1—unsolicited.

Mty<1:2> and TCA together specify the recipient of the message. Valid values are defined below:

TABLE 22

Mailbox ID Encoding

| Mty<1:2> | Processor | Meaning of TCA field |
|---|---|---|
| 01* | System CPU | System CPU address |
| | | x'0' - IOP 0 |
| | | x'1' - IOP 1 |
| 11 | non-CPU | x'2' - IOP 2 |
| | | x'3' - IOP 3 |
| | | x'4' - SVP |

* One of the SYSCOM Mailbox signals is defined as the Recovery_Quiesce signal (set=X'0A', reset–X'02', MTy– b'001', TCA=CPU Addr (b'000':b'111')). there is one Rcvy_ Quiesce signal per CPU. When set by a CHM or other unit, a Recovery Machine Check condition is recognized. There is no control block associated with this signal.

Currently, the only message type being implemented is an unsolicited one, called 'IFCC Logout Pending'. The associated CB is called "Logout Queue Header'. It is sent by an IOP to the SVP. Codes used for that purpose are: Mty= b'111' and TCA=x'4'. CSSW will set and reset this signal if needed during I/O recovery.

Qid: Queue ID. Valid values are 0–7, specifying one of the eight IOP_Queues.

0—reserved

1—Error Queue

2—Work Queue

3—Busy Queue

4–7—reserved

QTa Queue type (a). Valid values are defined below:

TABLE 23

Queue Type Encoding for Work_Q Transactions

| OTa | Queue Type |
|---|---|
| 0 | IOP_Queues |

QTb: Queue type (b). Valid values are defined below:

TABLE 24

Queue Type Encoding for SVP/CSSW Transactions

| OTb | Queue Type |
|---|---|
| 0 | Recovery Queue Initiated by CSSW |
| 1 | Normal Queue Initiated by CSSW |
| 2 | Low Priority Queue Initiated by CSSW |
| 3 | Response Queue Initiated by CSSW |
| 4 | Recovery Queue Initiated by the SVP |
| 5 | Normal Queue Initiated by the SVP |
| 6 | Response Queue Initiated by the SVP |

REB: The contents of the 'R' and 'B' bit positions are loaded into SSR<0> and SS R<2, respectively. The content of the 'E' bit position is ignored and SSR<1> is not affected. Each bit in the Sd1 field can be independently set to 0 or 1.

SPO: The contents of this field are loaded into SSR<13:15>. Valid values are 0–7.

TCA: Target CPU address. Valid values are 0–7. It indicates the system CPU address for Control State CIS, and logical processor address for domain interruptions.

3.1.1 Summary Of SYSCOM Transactions

This section gives a summary of who receives a signal by transaction type.

I/O_Rupt: Signal the status of the I/O interruption queue specified in SYSCOM data. The queue is identified by domain number (or Control State) and interruption subclass code; however, since there is only one Control State I/O interruption queue, the interruption subclass code is irrelevant in this case. An opcode of x'00' signals an empty queue, and x'08' signals a non-empty queue. The following CPUs are presented with the new status:

a. For a domain I/O interruption queue, these are those system CPUs that are running the specified domain. This transaction also turns on the specified ISC bit of the ISC masks of these system CPUs. The CPUs are presented with the new status of the domain I/O interruption queue of the specified interruption subclass (1 of 8).

b. For a Control State I/O interruption queue, all system CPUs are presented with the new status of the Control State interruption queue.

IOP_Queues: Signal the status of the IOP queue specified in SYSCOM data. An opcode of x'01' signals an empty queue, and x'09' signals a non-empty queue. The IOP is presented with the new status of the specified queue (1 of 8). The signal (set=X'09', reset=X'01', QID=001) is the CHM_Quiesce signal, associated with the IOP error queue, used by CSSW and CPUs to request a CHM to quiesce during recovery processing.

Mail_Box: Signal the status of the mailbox specified in SYSCOM data. An opcode of x'02' signals no message, and x'0A' signals that there are messages pending. The owner of the mailbox is presented with the new mailbox status for the specified message type (1 of 2).

Misc_Rupt: Signal the status of the interruption specified in SYSCOM data. An opcode of x'03' signals that the interruption has been cleared, and x'08' signals that there are interruptions pending. The following recipient(s) are presented with the new status:

a. For system recovery interruption, channel report pending interruption, channel subsystem damage interruption, and external damage interruption, if it is a domain interruption (Did≠0), all system CPUs that run the designated domain are presented with new status of the interruption; if it is a system interruption (Did=0), all system CPUs are presented with the new status of the interruption.

b. For service signal interruption, all system CPUs that run the designated domain are presented with the new status of the interruption. (There is no system service signal interruption.)

c. For degradation interruption and external address compare interruption, all system CPUs are presented with the new status of the interruption. (SYSCOM does not handle corresponding domain interruptions.)

SVP/CSSW: Signal the status of the SVP/CSSW interface queue specified in SYSCOM data. An opcode of x'03' signals an empty queue, and x'0B' signals a non-empty queue. For a queue initiated by CSSW, the SVP is presented with the new status of the designated queue (1 of 4). For a queue initiated by the SVP, CSSW is presented with the new status of the designated queue on all CPUs via a CI, if the CI is enabled. (1 of 3).

Ext_Call: Signal the status of the external call interruption. An opcode of x'04' signals that the interruption has been cleared, and x'0C' signals that there is an interruption pending. The SYSCOM data designates the recipient by domain number and target CPU address. For a domain interruption (Did≠0), the system CPU running the designated logical processor is presented with the new status. For a system interruption (Did=0), the system CPU designated by the TCA field is presented with the new status.

Emg_Signal: Signal the status of the emergency signal interruption. An opcode of x'05' signals that the interruption has been cleared, and x'0D' signals that there is an interruption pending. The SYSCOM data designates the recipient by domain number and target CPU address. For a domain interruption (Did≠0), the system CPU running the designated logical processor is presented with the new status. For a system interruption (Did=0), the system CPU designated by the TCA field is presented with the new status.

ISC_Mask: Update an 8-bit ISC mask maintained by SYSCOM for the requesting system CPU.

a. An opcode of x'10' causes the bit designated in SYSCOM data to be reset to zero; thus, disabling future I/O interruptions of the designated subclass on the requesting system CPU. In addition, this opcode also turns on the I/O Rupt SYSCOM matrix bit designated by the specified ISC and the domain number active on the requesting system CPU (i.e., other CPUs running the same domain and have the corresponding ISC mask enabled will be presented with the status that this I/O interruption exists). The reason for bundling the two functions (reset ISC mask and set I/O rupt) into one opcode is that the two functions are expected to be always performed together.

b. An opcode of x'11' causes the entire ISC mask to be set to ones.

Implementation Note: An ISC transaction (x'10' or x'11') will function the same in System/370 and ESA/390 modes. However, the intention is for a CPU to use it to set or reset the SYSCOM ISC mask only in domain-native System/370 mode; the transaction is not used in ESA/390 mode.

Configuration: An opcode of x'12' signals to SYSCOM the new logical processor (identified by domain number and LPA in SYSCOM data) to run in the requesting system CPU. This transaction also causes the entire ISC mask of the requesting system CPU to be set to ones; this enables SYSCOM to signal the CPU the presence of any I/O rupt for the specified domain. There are no recipients other than SYSCOM for this transaction.

Programming Note: When issuing this transaction to inform SYSCOM of the configuration change, one must ensure that the data agrees with that in the RA "Domain CPU Data". Otherwise, signals may be sent to the wrong CPU.

Load_SSR: Load the Computer Extended TOD-clock Sync-Select register (SSR). An opcode of x'1E' loads the R, B and A fields in the first byte. An opcode of x'1F' loads the SPO field in the second byte. Bits 1, 3:4 and 8:12 of SSR are not changed.

3.2 Signaling Control State Software

SYSCOM signals Control State software via Control Interceptions (CIs). There is a separate CI associated with each SYSCOM signal where CSSW is a recipient. When the signal is '1' and the associated CI is not masked, the CI occurs. Depending on the particular signal, the associated CI may be floating, or be CPU-specific.

3.3 Obtaining Signals Received By A System CPU

SYSCOM signals received by a system CPU are "readable" by Control State software in a register in the RA. A system CPU presents only signals it receives in its RA. The contents of the register stored by one of the store RA instructions gives the snapshot of the SYSCOM signals received by the system CPU when the register is stored. Modifying the contents of the register by any of the RA-manipulation instructions has no effect on the signals as "seen" by the system CPU.

4. SYSCOM Queue

Many SYSCOM control blocks are part of a queue structure. General format of these control blocks and protocols for accessing and manipulating them have been established and are described in the sections below.

4.1 SYSCOM Queue Structures

4.1.1 Queue Element Access

Queue elements are classified according to how they can be accessed:

1. Direct Access Elements. Queue elements can be directly accessed by a unique ID, regardless of whether the element is queued (e.g., SCBs can be directly accessed by subchannel numbers).

In order to gain exclusive access to such an element for, say, an update, the queue element must be locked. In order to gain exclusive access to the forward/backward queue pointer fields, both the queue header and the queue element must be locked. (The queue header must be locked while any queueing function is performed.) Contents retrieved from an unlocked queue element may be inconsistent.

2. Non-Direct Access Elements. An ID may or may not exist for this type of queue element. Even if there is a queue element ID associated, the queue element is not directly accessed via the ID. It is accessed only by its address or through the queue header. Such an element can be queued in either a SYSCOM-defined queue or a free-element queue, or it is not queued. For this type of queue element, the lock word is not defined and the following access protocol should be followed.

In order to gain exclusive (write) access to the queue header and all the queue elements in the queue, and to perform queueing functions, the queue header must be locked. In order to gain exclusive access to a queue element that is not in a queue, the processor or program must have last dequeued the element. Queue header or queue element contents retrieved from an unlocked queue may be inconsistent.

4.1.2 Queue Header and Element Format

The general format is depicted below. This format allows a control block to be a queue element and a queue header of a different queue at the same time. For control blocks that do not serve both as an element and a header, not all fields shown are defined. Fields that are not defined in a particular control block (e.g., the Q Length field is not defined in a control block that serves only as a queue element) may be used to contain control-block-specific information.

```
Word 0              Lock Word
Word 1        BID    QID    Q Length
Word 2          Top-of-Q Pointer
Word 3         Bottom-of-Q Pointer
Word 4         Forward-Q-Pointer
Word 5         Backward-Q-Pointer
Word 6         Control-Block-Specific
  *               Information
  *
           0      7 8     1 1      3
                          5 6      1
```

The functions of each field are:

1. Lock Word

It is defined for all control blocks that serve as a queue header and for all queue elements that are of the direct-access type.

2. BID

3. QID

QID identifies the current queue type (e.g., I/O rupt queue) of the queue that this control block is an element of. Unique identification of queues within a queue type (e.g., I/O rupt queue of interruption subclass x for CPU y) is found in the block-specific information area. This field is not defined if the control block will not be used as a queue element. If the control block is currently not on any queue, this field is set to zero.

4. Q Length

This field indicates the total number of elements on the queue that this control block serves as a queue header. Zero indicates an empty queue. This field is defined only for queue headers.

5. Top-of-Q Pointer

This field contains a 31-bit address of the first element of the queue anchored on this control block as a queue header. This field is defined only for queue headers.

6. Bottom-of-Q Pointer

This field contains a 31-bit address of the last element of the queue anchored on this control block as a queue header. This field is defined only for queue headers.

7. Forward-Q-Pointer

This field contains a 31-bit address of the next succeeding element in the queue to which this control block belongs. If the control block is the last element in the queue, (i) for doubly-linked queues, the pointer points to the queue header, and (ii) for singly-linked queues, the field is undefined. This field is defined only for queue elements.

8. Backward-Q-Pointer

This field contains a 31-bit address of the preceding element in a doubly-linked queue to which this control block belongs. The pointer points to the queue header if the control block is the first element in the queue. This field is defined only for queue elements that are doubly-linked.

TABLE 26

| OID (hex) | QID Assignment<br>Queue Name or Condition |
|---|---|
| X0 | Not on Any Queue |
| X1 | IOP_Queues |
| X2 | I/O Interrupt Queue |
| X3 | CCB Queue |
| X4 | CSCB Queue |
| X5 | BQH Queue |
| X6 | (Reserved for I/O queues) |

TABLE 26-continued

| OID (hex) | QID Assignment |
|---|---|
| | Queue Name or Condition |
| X7 | (Reserved) |
| 08 | Recovery Queue Initiated by CSSW |
| 18 | Normal Queue Initiated by CSSW |
| 28 | Low Priority Queue Initiated by CSSW |
| 38 | Response Queue Initiated by CSSW |
| 48 | Recovery Queue Initiated by the SVP |
| 58 | Normal Queue Initiated by the SVP |
| 68 | Response Queue Initiated by the SVP |
| 78, 88, 98, A8, B8, C8, D8, E8, F8 | (Reserved) |
| X9 | MCAI Queue |
| XA, XB, XC, XD, XE, XF | (Reserved) |

X = any hexadecimal digit 4.1.3 Null Pointer Format and Usage

A pointer that does not address a valid location is referred to as a null pointer. Its format is:

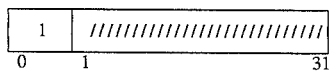

That is, bit 0 is 1. Bits 1:31 are irrelevant and ignored. By contrast, bit 0 of a valid pointer must be zero.

Programming Note: When a pointer changes from valid to null, bits 1:31 may remain unchanged to show the previous target location. This practice may be valuable for recovery. When a pointer is initialized as null (i.e., does not point to anywhere), the value x'8000 0001', called the Initial Null Pointer, must be used.

A null pointer value may be stored in pointers that are pointing nowhere. Examples of such pointers include the forward-Q-pointer in the last element of a singly-linked queue, and the top-of-Q or bottom-of-Q pointer in the queue header of an empty queue. In these cases, however, it is not a requirement that a null pointer must be used. (The pointer field is undefined and ignored for the purpose of locating the next queue element.) The Q Length field in the control block is the primary means of determining whether the aforementioned pointers are valid. For added reliability, the subsystems using the control blocks may establish a convention to use a null pointer value as a secondary means of determining the validity of the pointers.

4.2 Queueing Protocols and Function 4.2.1 Queueing Functions

Four queueing functions are defined for the manipulation of SYSCOM queues. There are:

Enqueue (queue_header_addr, queue_element_adr):

The queue element addressed by queue_element_adr is placed at the top of the queue defined by the queue header addressed by queue_header_adr. For direct-access elements, the queue element to be requeued is assumed to have been locked by the requesting entity.

Requeue (queue_header_adr, queue_element_adr):

The queue element addressed by queue_element_adr is placed at the top of the queue defined by the queue header addressed by queue_header_adr. For direct-access elements, the queue element to be requeued is assumed to have been locked by the requesting entity.

Dequeue (queue_header_adr, queue_element_adr):

The queue_element_adr is not used as input to this function. The queue element at the top of the queue defined by the queue header addressed by queue_header_adr is removed from the queue; the address of the dequeued queue element is returned as queue_element_adr. It is assumed that the queue element being dequeued is not locked by the requesting entity.

Remove (queue_header_adr, queue_element_adr:

The queue element addressed by queue_element_adr is removed from the queue defined by the queue header addressed by queue_header_adr. For doubly-linked queues, no check is made to ensure that the queue element being deleted was in the queue defined by the designated queue header. For singly-linked queues, the queue element to be deleted is searched from the designated queue header. It is assumed that the queue element being dequeued is not locked by the requesting entity.

4.2.2 Queueing Protocols

The protocols for these queueing functions are as follows:

1. Lock the designated queue header. Also lock the queue elements whose queue pointers are to be adjusted if these elements are of the direct-access type and if they are not already locked t=by the requesting entity. The lock function is described in Section 2, "Locking A SYSCOM Control Block".

Because of the locking convention described in Section 3.2.3, locking the queue header for the "remove" function requires unlocking the designated element if it is already locked by the requesting entity, and then relocking it again after the header is locked. When the designated element is relocked, it should be examined to determine if the "remove" function should continue (it may have already been dequeued).

For the "dequeue" ("remove") function, if the top element (element to be removed) is found to be already locked by the requesting entity, the function is completed without locking the queue header or dequeueing (removing); the lock of the top element (element to be removed) is not changed.

2. Signal SYSCOM to reset the corresponding SYSCOM bit to zero.

3. Adjust queue pointers.

4. Update the queue-length field in the queue header.

5. Set the QID field of the designated queue element appropriately.

6. Unlock the queue header and queue elements that are locked due to the queueing function and were unlocked when the queueing function was initiated. The element (en-/re-)queued, dequeued, or removed remains locked by the requesting entity.

7. If the resulting queue is nonempty, signal SYSCOM to set the corresponding SYSCOM bit to 1.

4.2.3 Locking Convention

In order to get exclusive access to a direct-access type queue element, the element must be locked. In order to perform one of the four defined queueing functions, the queue header must be locked. It is therefore possible for two locking entities to come into a deadlock. To help prevent deadlocks, the following locking convention must be followed when manipulating SYSCOM queues and direct-access type queue elements:

When dequeuing or removing an element from a queue, the queue header must be locked before locking a queue element that is on the queue. This may require unlocking a locked element in order to lock a queue header and then relocking the element again. When enqueueing or requeueing, the element to be added, which is not yet on a queue, is locked before locking the queue header; other elements that are on the queue and need to be locked for the queueing function, are locked after locking the queue header.

A detailed example of the operation of the present invention is given by the control routine for an XA INTERRUPT communication as set forth in TABLE 27 and by a work queue routine as set forth in TABLE 28.

TABLE 27
COPYRIGHT 1991 AMDAHL CORPORATION
XA INTERRUPT
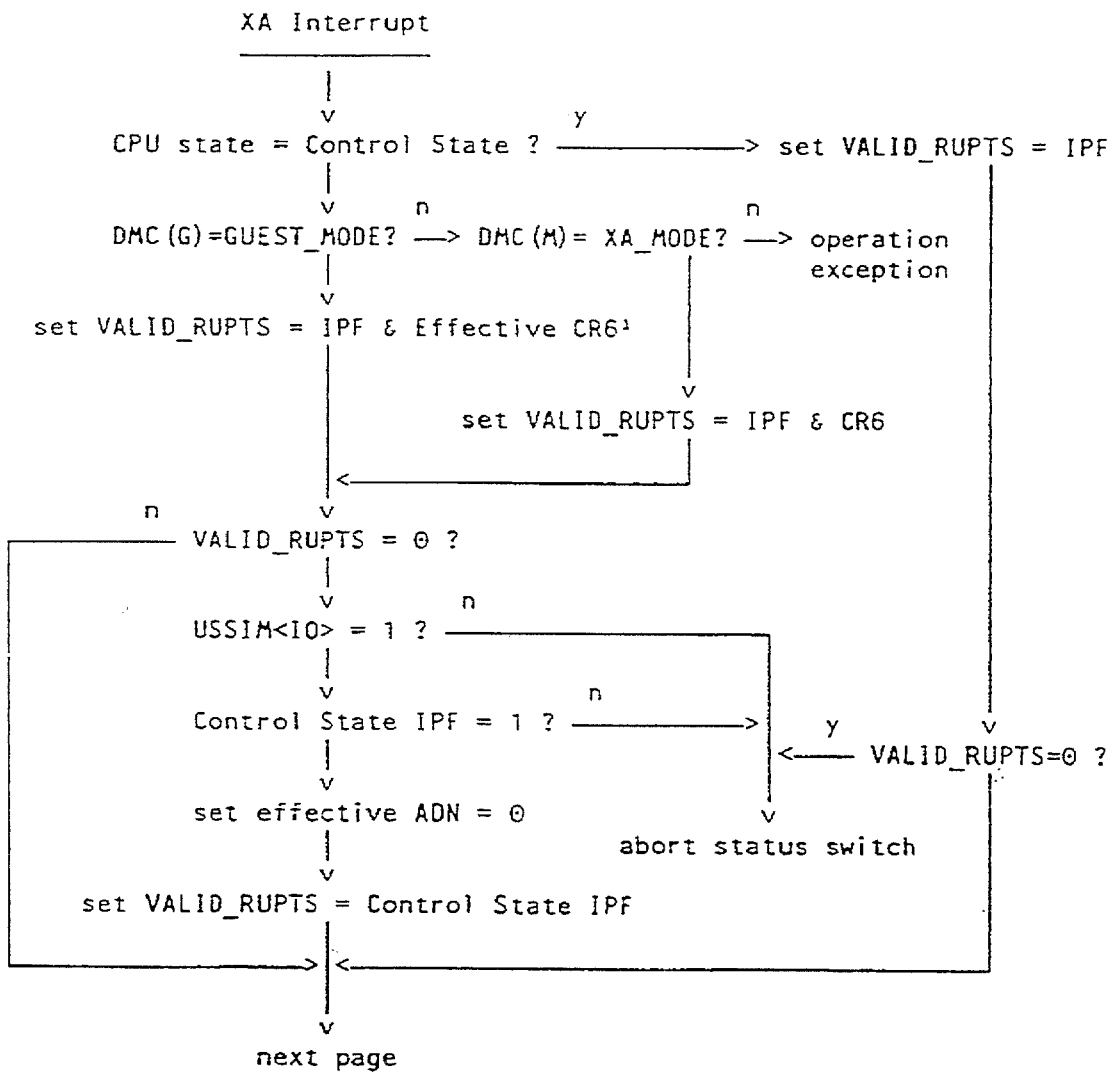
[1] — the Effective CR6 is built on entry to interpretive execution mode during execution of the SIE instruction.

```
                    from previous page
                    ─────────────────
                            |
                            |<──────────────────────────────┐
                            v                               │
            set ISC = bit position of                       │
            the leftmost '1' in VALID_RUPTS                 │
                            |                               │
                            v                               │
            IQH.PTR=IQH.ARRAY_PTR + 1024*ADN + 128*ISC      │
                                                            │
                            |<──────── lock timeout? <──┐   │
                            v                   | y     │   │
            issue 'lock IQH request'            └──> timeout│
                            |                        error │
                            v           n                n │
            lock request successful? ────> IQH locked by ──┤
                            |              CPU ucode ?     │
                            v                              │
            call 'Verify IQH' [71]                         │
                            |                              │
                            v                              │
            reset IPF(ISC)              ┌─1─┐              │
                            |             |                │
                            v       y     v                │
            IQH.QUEUE_LENGTH = 0 ? ────> unlock ──>        │
                            |             IQH              │
                            v                              │
           ¹set CB_PTR=IQH.TOP_PTR                         │
                            |                              │
                            |              v               │
                            |         set VALID_RUPTS(ISC)=0
                            |              |               │
                            |              v        n      │
                            |         VALID_RUPTS = 0 ? ───┘
                            |              |
                            |              └──> abort status switch
                            v
                       next page
                       ─────────
```

¹ — CB refers to 'Control Block' and, for the Control State queue, the CB can be either an SCB or a CHCB. For XA domains, the CB can only be an SCB.

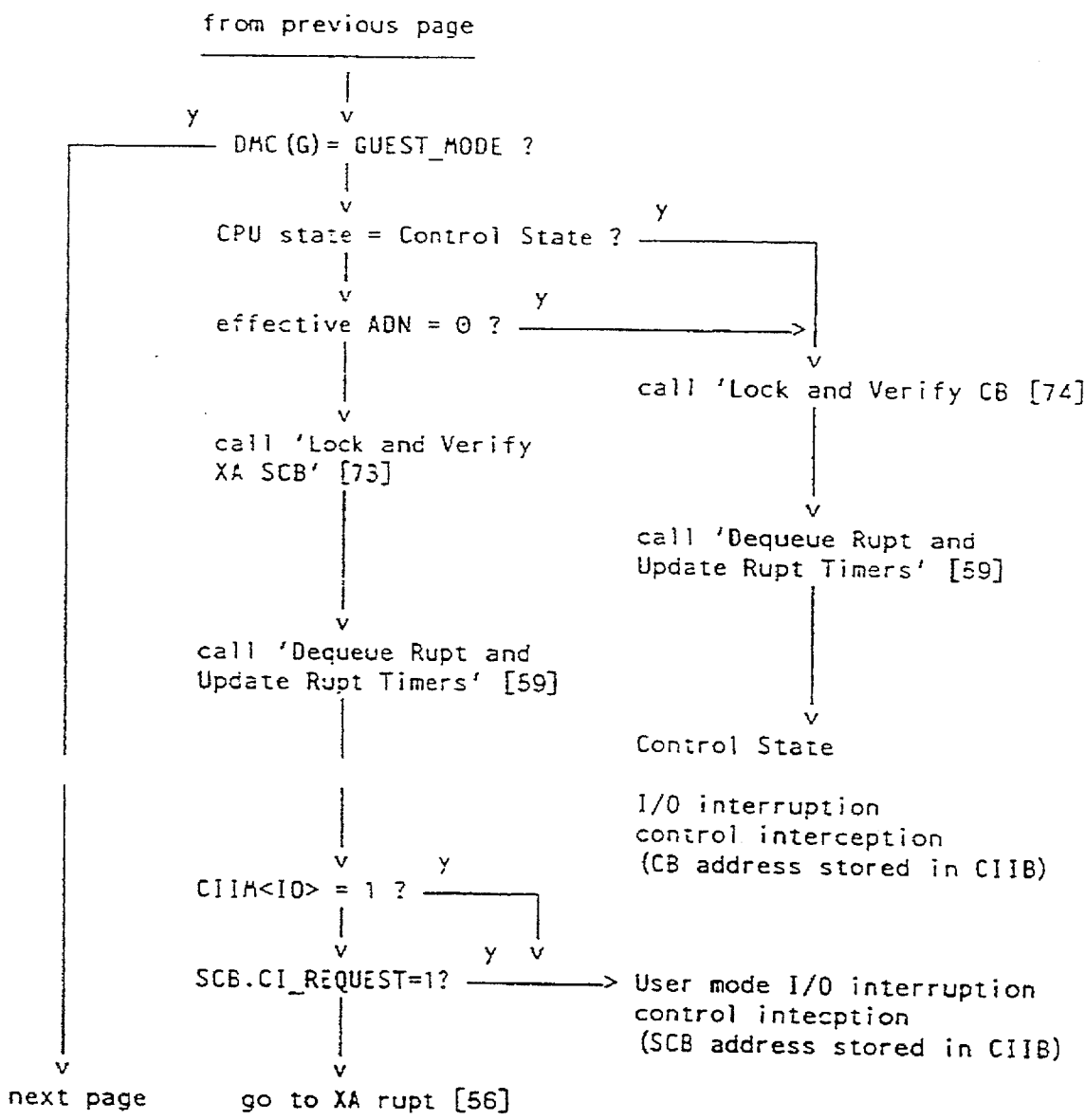

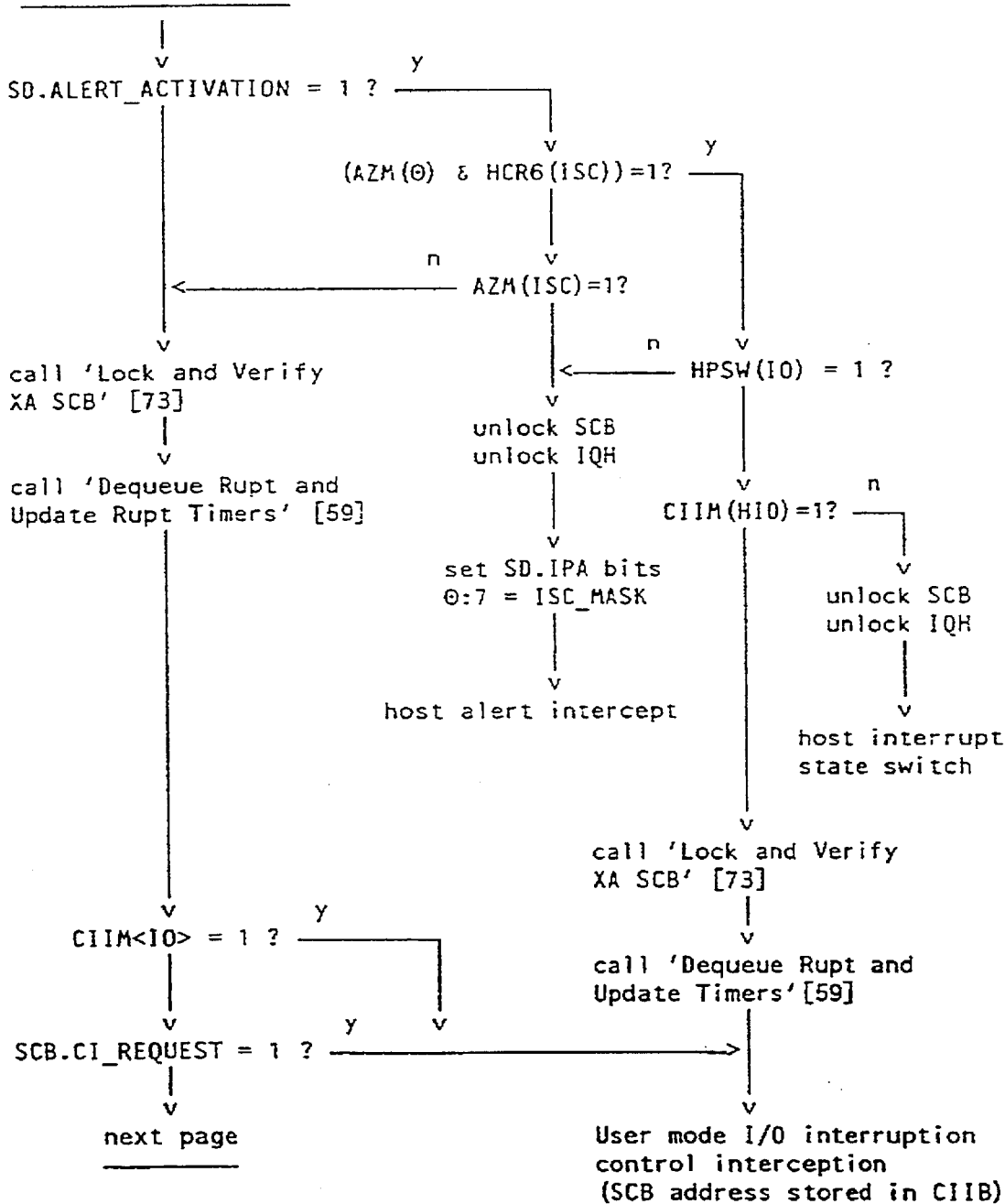

```
              from previous page
                (guest rupt)
                     |
                     v
              set ISC = GISC
                     |
                     v                    n
              SCB.INTERPRET = 1 ? ─────────────┐
                     |                         |
         n           v                         |
   ┌──── DMC(M)=XA_MODE?                       |
   |         |                                 |
   |         v                    n            |
   |  GCR6(SCB.GISC) = 1 ? ───────────┐        |
   |         |                        |        |
   |         v                        |        |
   |  next page: XA rupt              |        |
   |                                  |        |
   v           y                      |        |
 PSW(E) = BC mode ? ─────────────────────────→ |
   |                                  |        |
   v                                  |        |
 set CHAN_NUM = SCB.RUPT_PARM, byte 2  |        |
   |                                  |        |
   v              n                   |        |
 GCR2(CHAN_NUM) = 1 ? ───────────────────────→ |
   |                                  |        |
   v              y                   |        |
 type-b status in SCB ? ─────────────────────→ |
 (type-b status includes any                   |
  of the following SCB states:                 |
  SCB.LOGOUT = 1                    v
  SCB.DEFER_CC = 1 or 3      set SD.232 = '0001'X || SCB.SCB_NUM
  SCB.CCW_FORMAT = 1         set SD.236 = SCB.RUPT_PARM
  SCB.ZERO_CC = 1            set SD.240, 2:4 = ISC
  SCB.N = 1                  set SD.240, 13:15 = SCB.ZONE
  SCB.FC_HALT = 1            set SD.240, 16 = SCB.INTERPRET
  SCB.FC_CLEAR = 1           set SD.240, 0:1,5:12,17:31 = 0
  SCB.AC_SUSPENDED = 1                |
  SCB.DEV_STAT & DIM not = 0          v
  SCB.SBCH_STAT & SIM not = 0   set SCB.INTERPRET = 0
  CHAN_NUM > 31 )                     |
   |                                  v
   v                          execute code-60 Host Intercept
 next page: 370 rupt
```

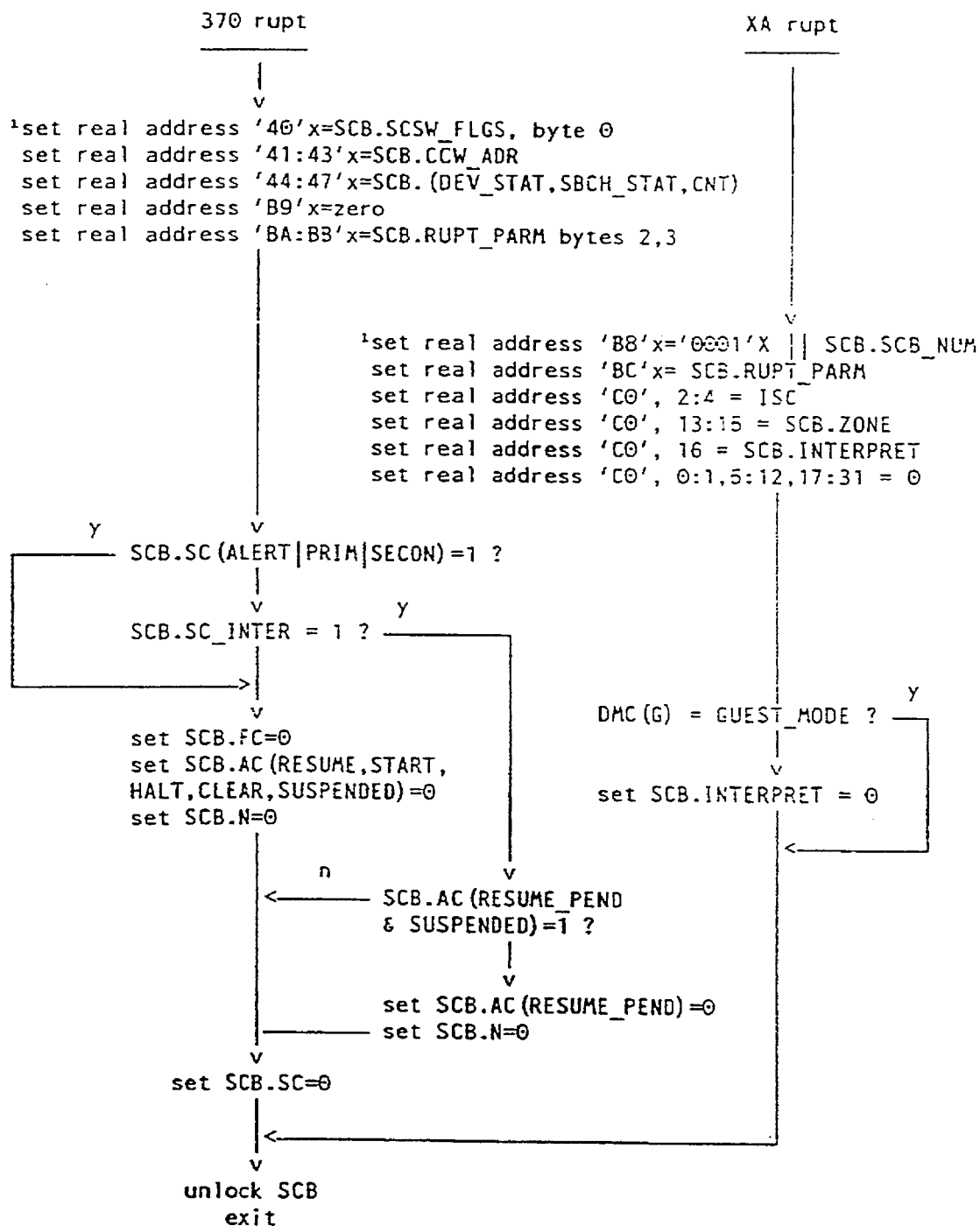
1 —low address protection, page protection and key-controlled protection do not apply to real addresses 'B8'x–'C0'x and '40'x–'47'x.

QUEUE CONTROL BLOCK ONTO WORK QUEUE
This subroutine is used to queue a control block onto to the Work Queue. The control blocks that may be queued onto the Work Queue are as follows: SCBs (XA only), CSCBs, CPSBs, and CHCBs.
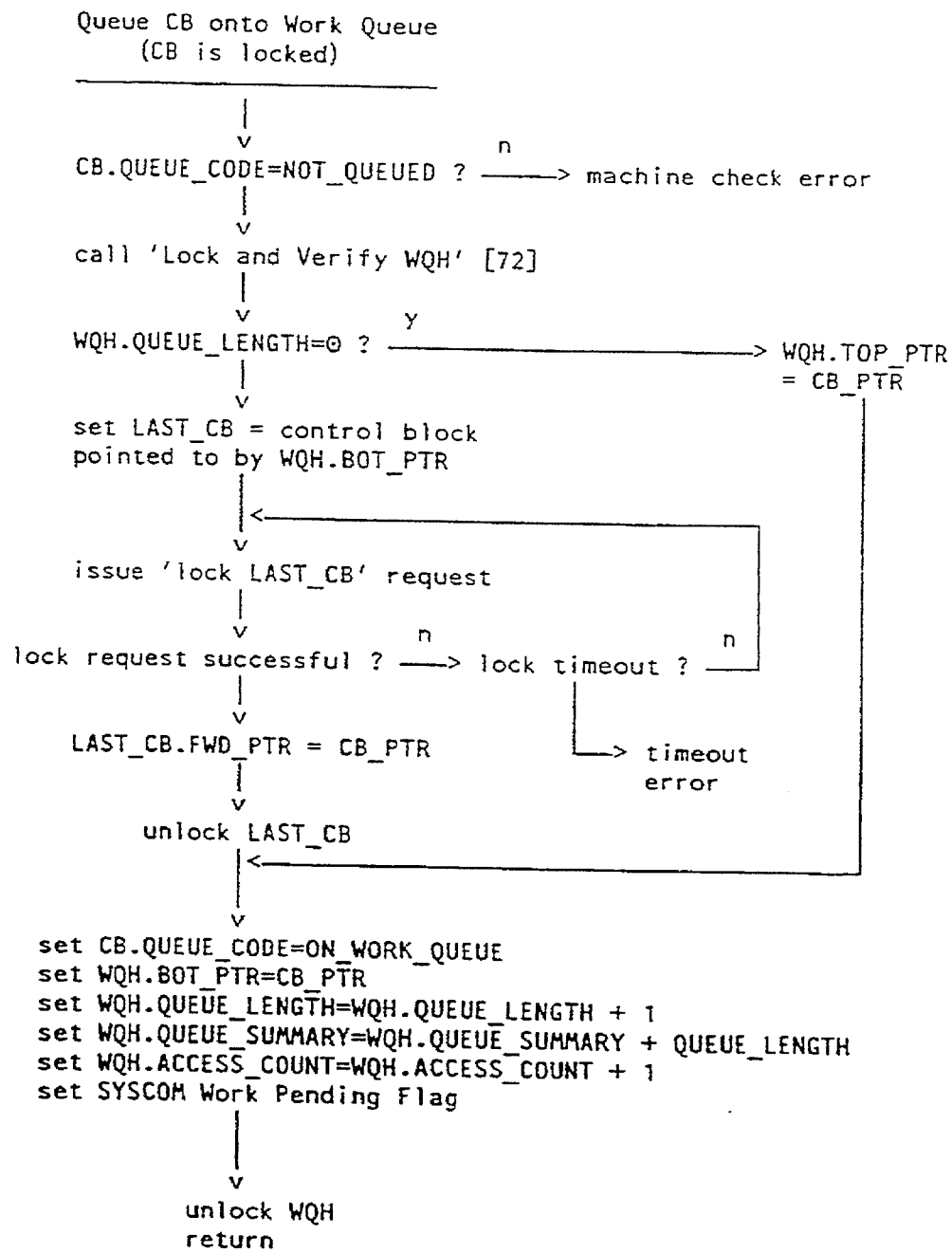

While the invention has been particularly shown and described with reference to preferred embodiments thereof it will be understood by those skilled in the art that various changes in form and details may be made therein without departing from the spirit and scope of the invention.

We claim:

1. A communication method for use in a computer system, said computer system comprising units, a common store connected to and accessible by each of said units, a control block in said common store assigned to a group of said units and an interface unit connected to each of said units, said communication method comprising the steps of:

a) originating a lock by a sending unit for said control block;

b) storing a message in a queue in said control block by said sending unit;

c) releasing said lock by said sending unit for said control block;

d) issuing an identifying signal by said sending unit to said interface unit identifying that said sending unit has stored a message into said control block for said group of units;

e) setting a message signal in said interface unit which is received by said group of units assigned to said control block indicating that a message has been stored in said queue of said control block for said group of units;

f) originating a lock by a unit of said group of units receiving said message signal for said control block for said group of units;

g) resetting said message signal when said unit of said group of units has obtained said lock for said control block for said group of units;

h) retrieving a message by said unit from said queue in said control block for said group of units;

i) deleting said message retrieved by said unit from said queue in said control block for said group of units;

j) releasing said lock by said unit for said control block for said group of units;

k) setting said message signal in said interface means for said group of units which included said unit that has deleted said message from said queue in said control block for said group of units when a message remains in said queue after said unit has deleted said message from said queue in said control block for said group of units.

* * * * *